(12) United States Patent
Nakamura

(10) Patent No.: US 11,416,190 B2
(45) Date of Patent: Aug. 16, 2022

(54) INFORMATION PROCESSING APPARATUS, CONTROL METHOD, AND NON-TRANSITORY COMPUTER-READABLE STORAGE MEDIUM STORING PROGRAM

(71) Applicant: CANON KABUSHIKI KAISHA, Tokyo (JP)

(72) Inventor: Akira Nakamura, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/932,519

(22) Filed: Jul. 17, 2020

(65) Prior Publication Data
US 2021/0026580 A1    Jan. 28, 2021

(30) Foreign Application Priority Data

Jul. 26, 2019   (JP) .............................. JP2019-138245

(51) Int. Cl.
*G06F 3/12*    (2006.01)

(52) U.S. Cl.
CPC .......... *G06F 3/1231* (2013.01); *G06F 3/1204* (2013.01); *G06F 3/126* (2013.01); *G06F 3/1287* (2013.01)

(58) Field of Classification Search
None
See application file for complete search history.

(56) References Cited

U.S. PATENT DOCUMENTS 5,754,747 A * 5/1998 Reilly ..................... H04L 29/06
358/1.15
8,488,143 B2 * 7/2013 Lozano ................. G06F 9/4411
358/1.15
2018/0329659 A1    11/2018 Matsui

FOREIGN PATENT DOCUMENTS

JP           4343673 B2    10/2009
KR      20140130855 A     11/2014

OTHER PUBLICATIONS

Machine translation of Japanese Patent Application No. 2015-132973 to Kaneda, dated Jul. 2015.*

* cited by examiner

*Primary Examiner* — Paul F Payer
(74) *Attorney, Agent, or Firm* — Canon U.S.A., Inc. I.P. Division

(57) ABSTRACT

An information processing apparatus for communicating with a printing apparatus includes a generation unit configured to generate, when communication with the printing apparatus using first port setting information in a print queue for the printing apparatus is disabled, second port setting information that is different from the first port setting information and that enables communication with the printing apparatus, the generation of the second port setting information being based on information acquired from the printing apparatus; and a change unit configured to change port setting information in the print queue from the first port setting information to the second port setting information. In response to an Internet Protocol (IP) address of the printing apparatus being changed after generation of the second port setting information, the information processing apparatus is able to use the second port setting information to communicate with the printing apparatus by automatically using the changed IP address.

18 Claims, 27 Drawing Sheets

FIG. 7

PRINTER SELECTION

SELECTION OF RECOVERY-TARGET PRINTER
Please select a recovery-target printer and click NEXT.

| PRODUCT NAME | SERIAL NUMBER | IP ADDRESS | MAC ADDRESS |
|---|---|---|---|
| ☑ ABCD | ****12345 | 192.168.1.1 | AA-BB-CC-DD-EE-FF |
| ☐ AAAA | ****11111 | 192.168.1.2 | AB-CD-EF-AB-CD-EF |
| ☐ BBBB | ****22222 | 192.168.1.3 | 11-22-33-44-55-66 |
| ☐ CCCC | ****33333 | 192.168.1.4 | 00-11-00-11-00-11 |
| ☐ DDDD | ****44444 | 192.168.1.5 | AA-55-AA-55-AA-55 |
| ☐ EEEE | ****55555 | 192.168.1.6 | FF-00-FF-00-FF-00 |

NEXT — 701

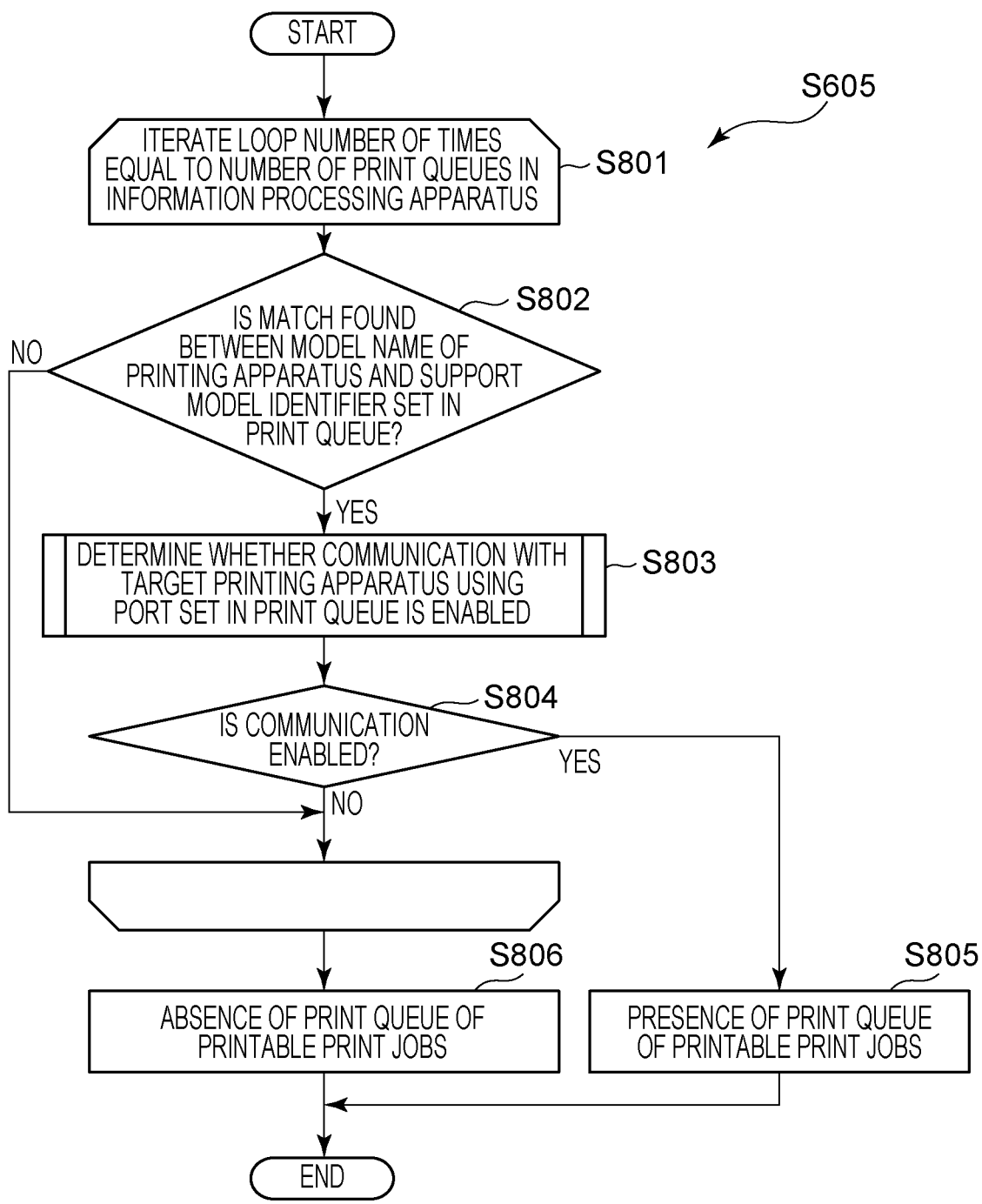

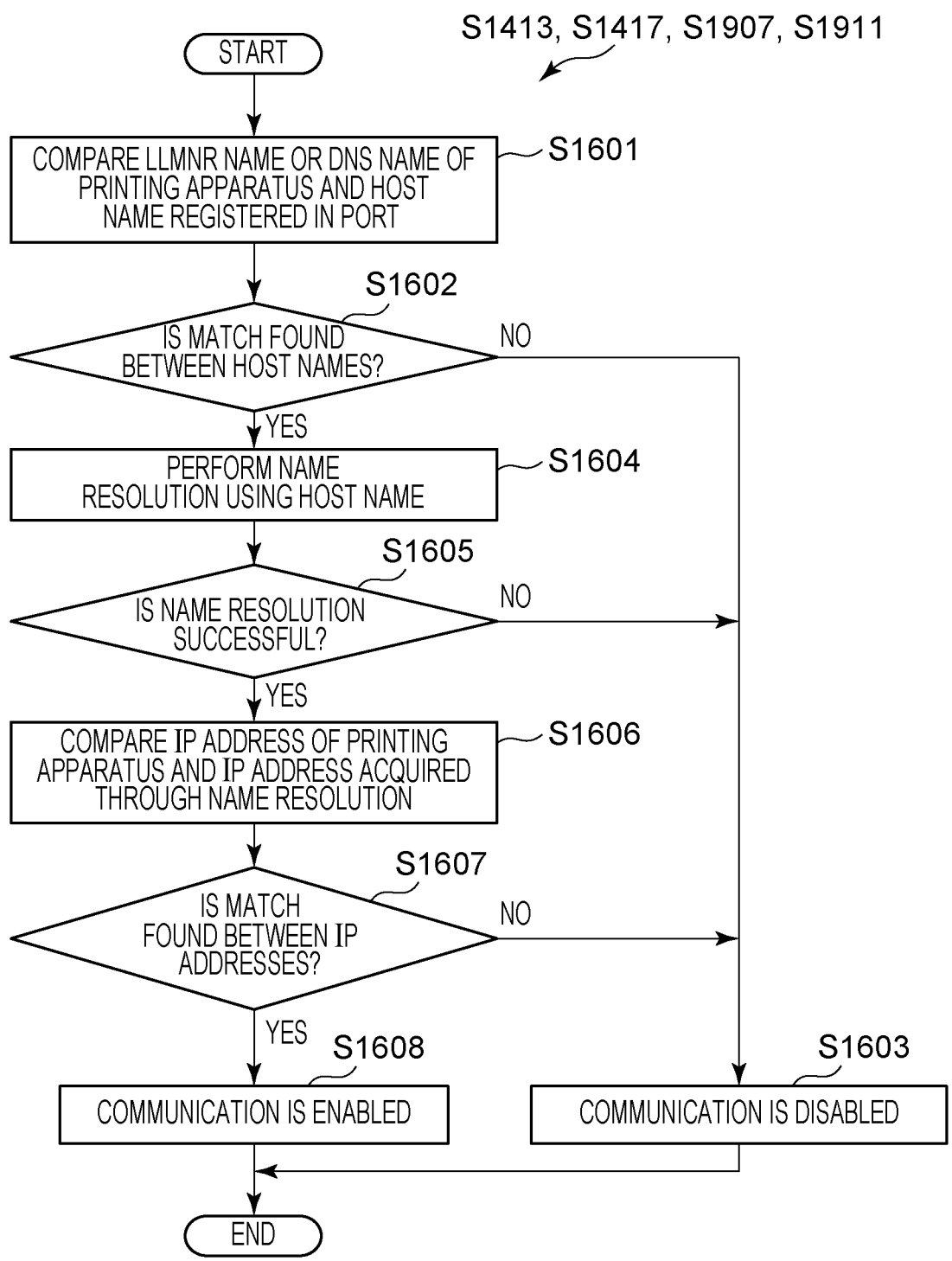

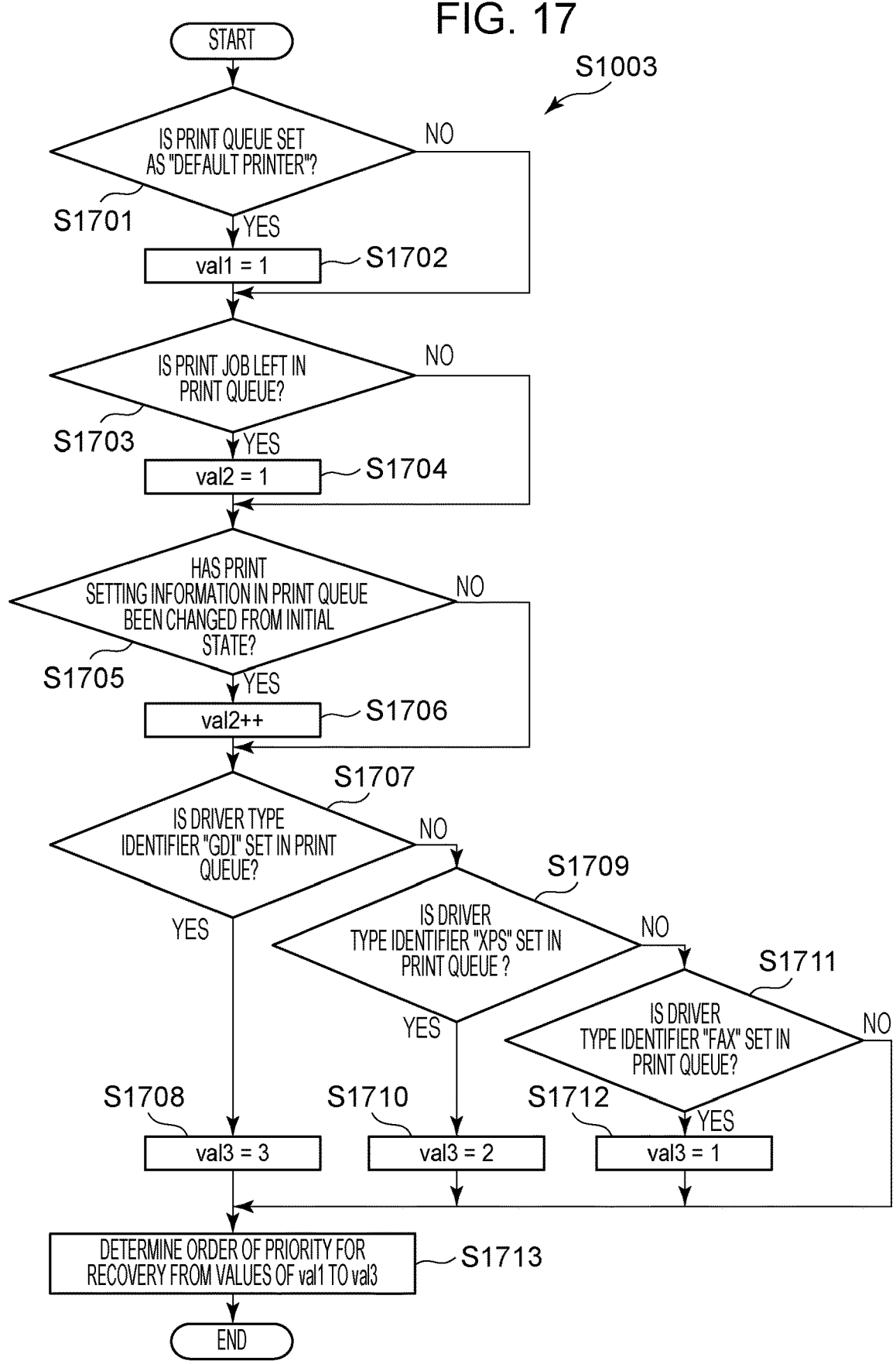

FIG. 18A

|  | PRINT QUEUE A | PRINT QUEUE B | PRINT QUEUE C |
|---|---|---|---|
| val1 | 1 | 0 | 0 |
| val2 | 0 | 2 | 1 |
| val3 | 2 | 1 | 3 |
| ORDER OF PRIORITY FOR RECOVERY | 1 | 2 | 3 |

FIG. 18B

|  | PRINT QUEUE A | PRINT QUEUE B | PRINT QUEUE C |
|---|---|---|---|
| val1(x3) | 1 | 0 | 0 |
| val2(x1.5) | 0 | 2 | 1 |
| val3(x1) | 2 | 1 | 3 |
| val | 5 | 4 | 4.5 |
| ORDER OF PRIORITY FOR RECOVERY | 1 | 3 | 2 |

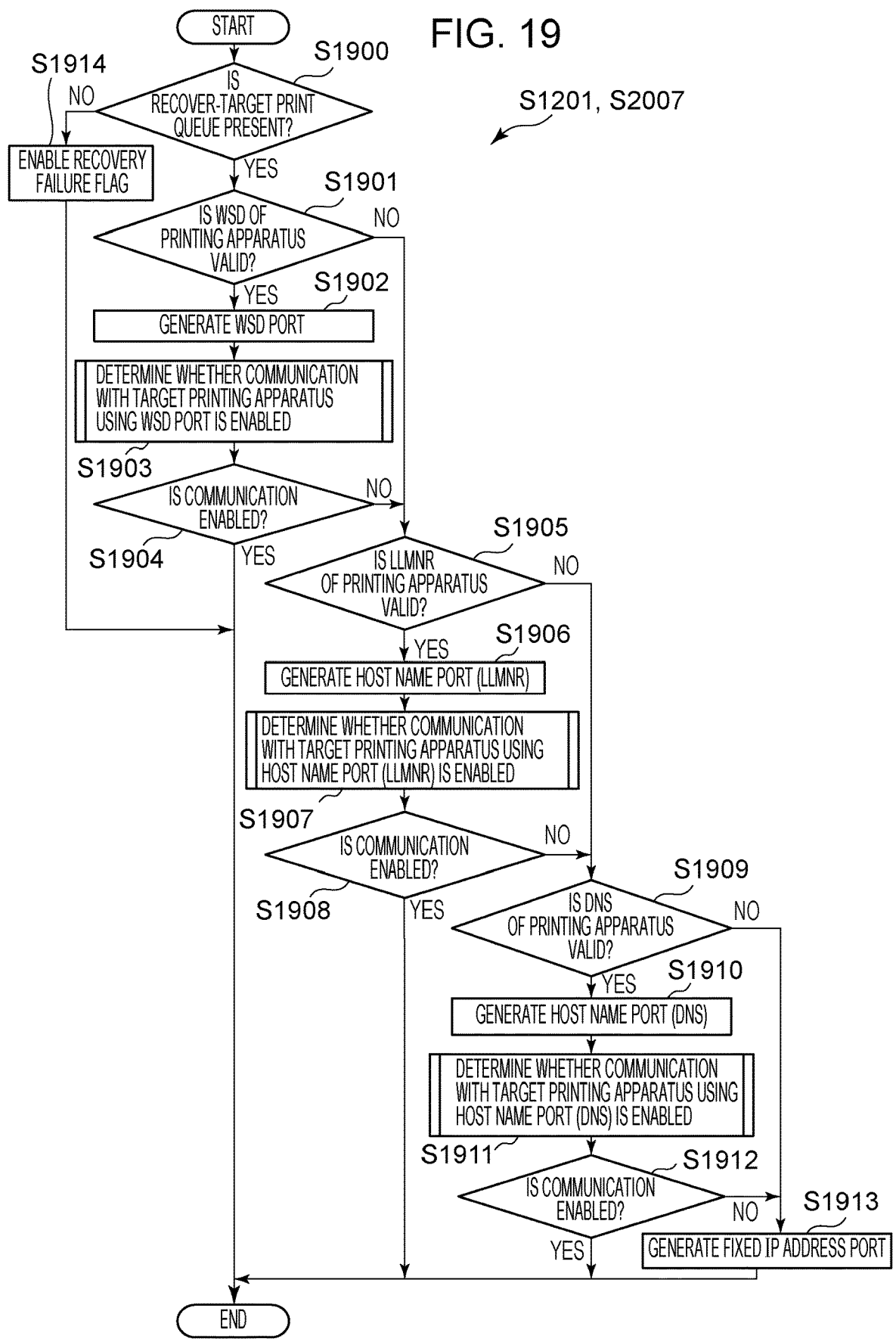

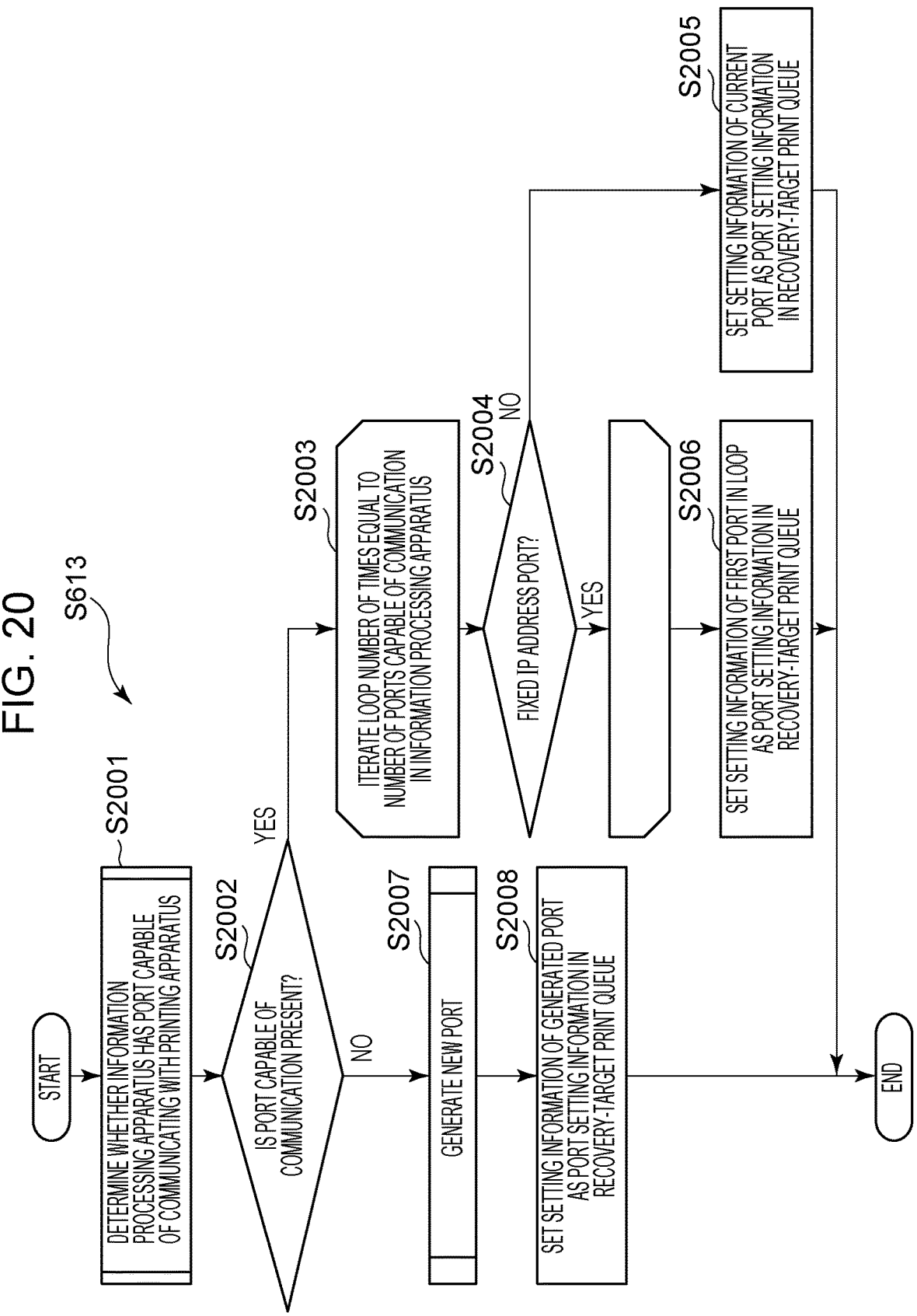

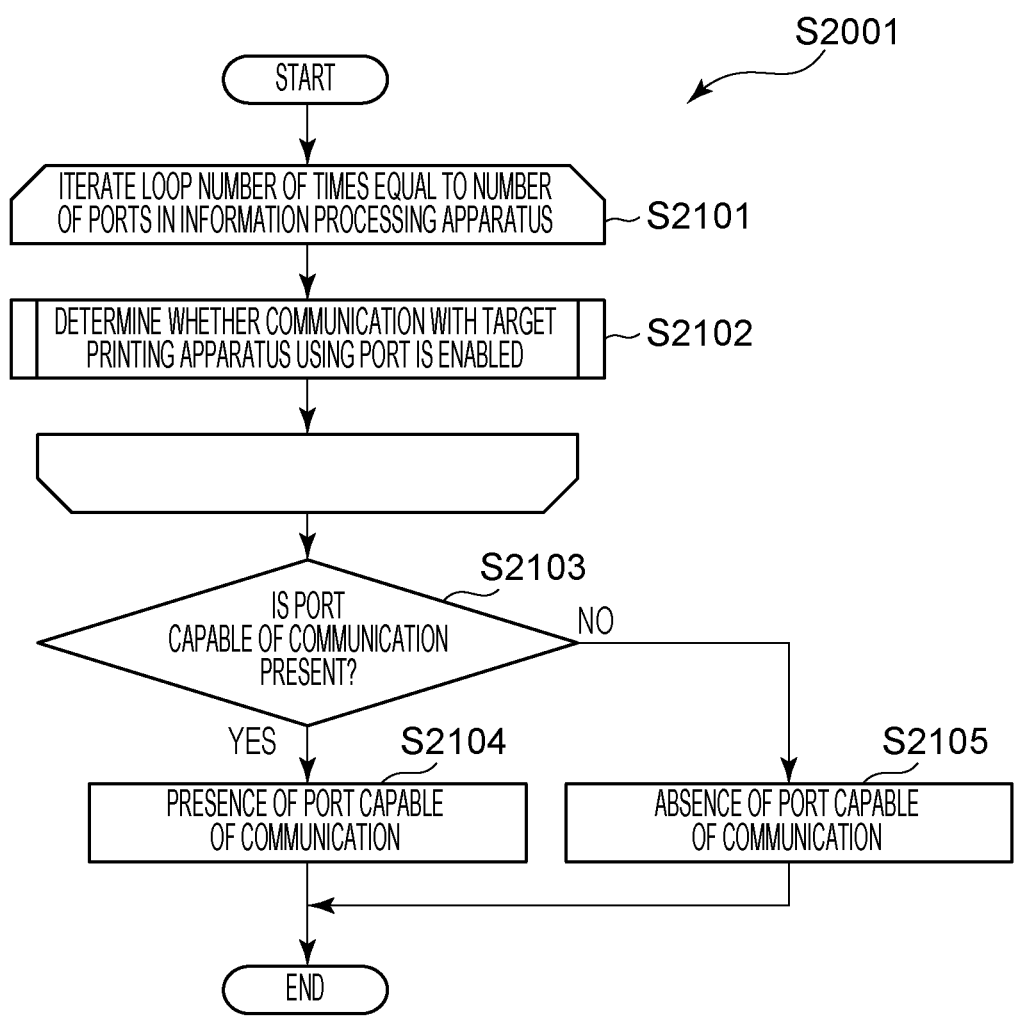

ABSTRACT# INFORMATION PROCESSING APPARATUS, CONTROL METHOD, AND NON-TRANSITORY COMPUTER-READABLE STORAGE MEDIUM STORING PROGRAM

BACKGROUND

Field

The present invention relates to an information processing apparatus, a control method, and a non-transitory computer-readable storage medium storing a program.

Description of the Related Art

In an environment where an information processing apparatus and a printing apparatus are connected to the same network, the information processing apparatus is capable of controlling the printing apparatus via the network. A solution for a case where the information processing apparatus and the printing apparatus are unable to communicate with each other via the network is disclosed in Japanese Patent No. 4343673.

SUMMARY

Various embodiments of the present disclosure provide a mechanism for improving convenience of use in a situation where communication is disabled between an information processing apparatus and a printing apparatus.

Various embodiments provide an information processing apparatus for communicating with a printing apparatus. The information processing apparatus includes a generation unit configured to generate, when communication with the printing apparatus using first port setting information in a print queue for the printing apparatus is disabled, second port setting information that is different from the first port setting information and that enables communication with the printing apparatus, the generation of the second port setting information being based on information acquired from the printing apparatus. The information processing apparatus also includes a change unit configured to change port setting information in the print queue from the first port setting information to the second port setting information, where, in response to an Internet Protocol (IP) address of the printing apparatus being changed after generation of the second port setting information, the information processing apparatus is able to use the second port setting information to communicate with the printing apparatus by automatically using the changed IP address, wherein the generation unit and the change unit are implemented by at least one processor of the information processing apparatus.

In various embodiments of the present disclosure, communication that improves convenience of use is enabled.

Further features will become apparent from the following description of exemplary embodiments with reference to the attached drawings.

BRIEF DESCRIPTION OF THE DRAWINGS

FIG. 7 illustrates an example user interface (UI) screen of the application according to one embodiment.

FIG. 8 is a flowchart illustrating a process of comparing information on the printing apparatus and information in a print queue according to one embodiment.

FIG. 16 is a flowchart illustrating a process of determining whether communication using a host name port is enabled according to one embodiment.

FIG. 17 is a flowchart illustrating a process of determining the order of priority for recovery according to one embodiment.

FIG. 18A and FIG. 18B illustrate example management tables of priority determination parameters in the application according to one embodiment.

FIG. 19 is a flowchart illustrating a port generation process according to one embodiment.

FIG. 20 is a flowchart illustrating a port recovery process according to one embodiment.

FIG. 21 is a flowchart illustrating a process of determining whether communication is enabled according to one embodiment.

DESCRIPTION OF THE EMBODIMENTS

Figure 1A:
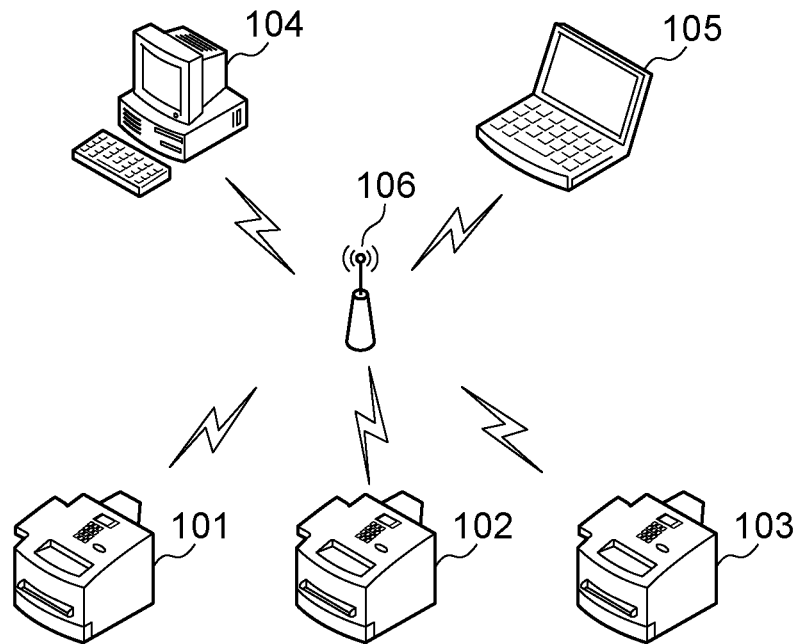
FIG. 1A and FIG. 1B are diagrams illustrating example device configurations according to various embodiments.

The following describes embodiments in detail with reference to the accompanying drawings. The following embodiments are not intended to limit the scope of the invention as defined in the claims. The embodiments present a plurality of features, and not all of the plurality of features are required for the invention. The plurality of features may be combined as appropriate. In the accompanying drawings, the same or similar elements are identified by the same reference numerals and will not be described repeatedly.

The configurations presented in the following embodiments are for illustrative purposes only, and the present disclosure is not limited to the illustrated configurations.

Figure 1B:
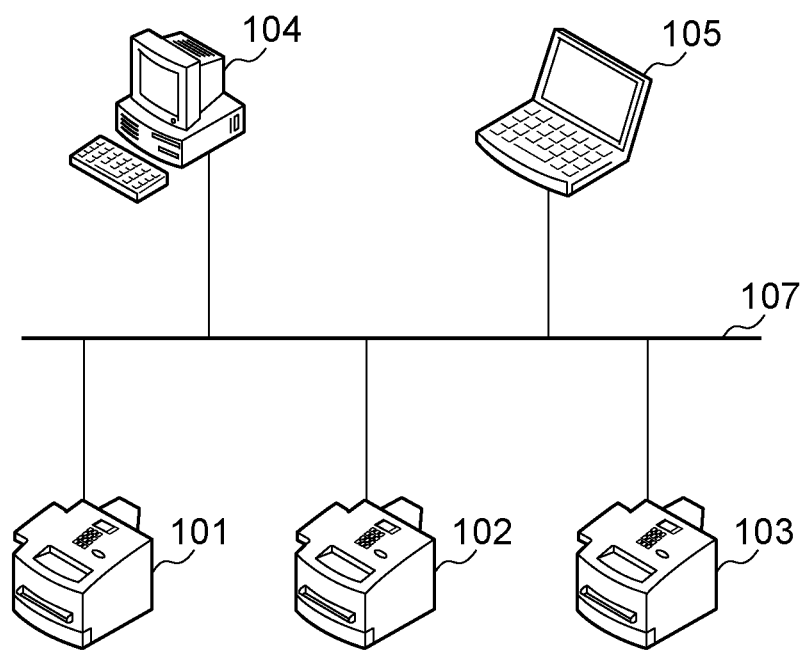

First, an overall configuration of a printing system according to an embodiment will be described. FIGS. 1A and 1B illustrate overall configurations of printing systems in which printing apparatuses and their host apparatuses, namely, information processing apparatuses, are connected in different ways.

The printing system illustrated in FIG. 1A includes three printing apparatuses 101 to 103 having a wireless local area network (LAN) communication function, and two information processing apparatuses 104 and 105 capable of communicating with the three printing apparatuses 101 to 103 via a wireless LAN. In FIG. 1A, the printing apparatuses 101 to 103 and the information processing apparatuses 104 and 105 are connected to the wireless LAN through an access point 106, and the information processing apparatuses 104 and 105 are each capable of controlling the printing apparatuses 101 to 103 via the wireless LAN.

In the printing system illustrated in FIG. 1B, three printing apparatuses 101 to 103 and two information processing apparatuses 104 and 105 are connected via a wired LAN cable 107.

Configuration of Printing Apparatus

Figure 2:
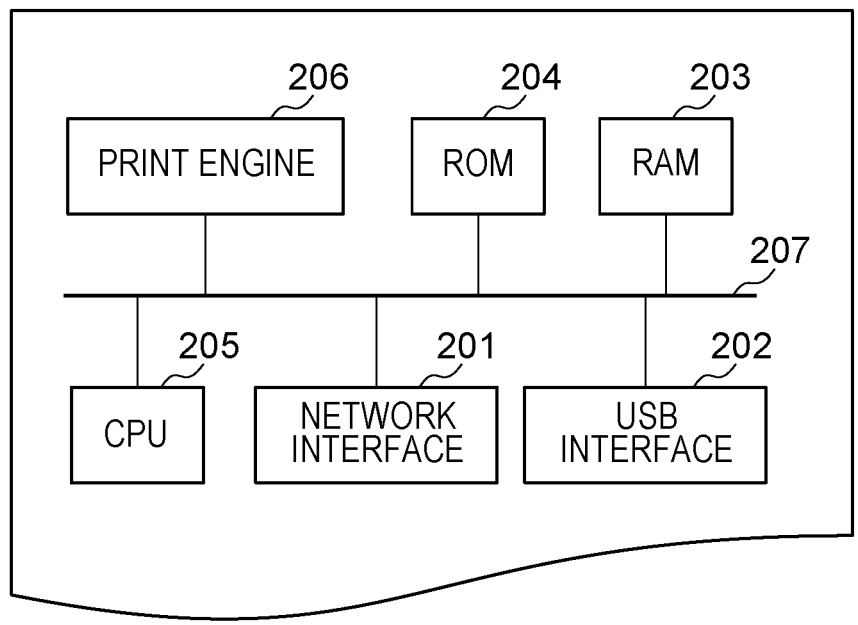
FIG. 2 is a hardware configuration diagram of an information processing apparatus according to one embodiment.

FIG. 2 is a diagram illustrating an example hardware configuration of the printing apparatuses 101 to 103.

Each printing apparatus includes a network interface 201, a Universal Serial Bus (USB) interface 202, a random access memory (RAM) 203, a read-only memory (ROM) 204, a central processing unit (CPU) 205, and a print engine 206. These components are interconnected via a system bus 207.

The network interface 201 is an interface that controls connection to a wireless LAN via the access point 106 or connection to a wired LAN via the wired LAN cable 107. The USB interface 202 is an interface that controls USB connection via a USB cable.

The RAM 203 is used as a main memory and a work memory of the CPU 205 and functions as a reception buffer for temporarily storing received print data or as a storage area for storing various data. The print engine 206 performs printing on the basis of the print data stored in the RAM 203. The print engine 206 may perform an inkjet printing process or perform an electrophotographic printing process. The ROM 204 stores various control programs and data to be used by the control programs. The CPU 205 controls the components of the printing apparatus in accordance with these control programs. The hardware configuration described above is an example, and the hardware configuration of the printing apparatus is not limited to that in the example described above.

The printing apparatuses 101 to 103 can support the Transmission Control Protocol/Internet Protocol (TCP/IP) protocol and use, for example, the function of the protocol or name resolution (the function of identifying an IP address from a computer name, a domain name, or the like) to set up a connection with other apparatuses. The function of the protocol is, for example, WS-Discovery function, which is one of the functions of Web Services on Devices (WSD). WSD is a standard protocol of the Windows (registered trademark) operating system (OS). With WS-Discovery, each device connected to a network can be detected on the basis of an identifier (universally unique identifier (UUID)) capable of uniquely identifying the device. The name resolution may be implemented using, for example, the Domain Name System (DNS), which manages the correspondence between IP addresses and domain names. Alternatively, Link-Local Multicast Name Resolution (LLMNR) may be used, which enables name resolution of a nearby network device when there is no DNS on the network. The WSD function, the LLMNR function, and the DNS function of the printing apparatuses 101 to 103 can be switched between valid and invalid states by users directly operating the printing apparatuses 101 to 103. Each of the printing apparatuses 101 to 103 is assigned a UUID, and the version of the UUID is assumed to be "version 1", indicating that the UUID includes the media access control (MAC) address of the corresponding one of the printing apparatuses 101 to 103 and the timestamp of the generation of the UUID.

Configuration of Information Processing Apparatus

Figure 3:
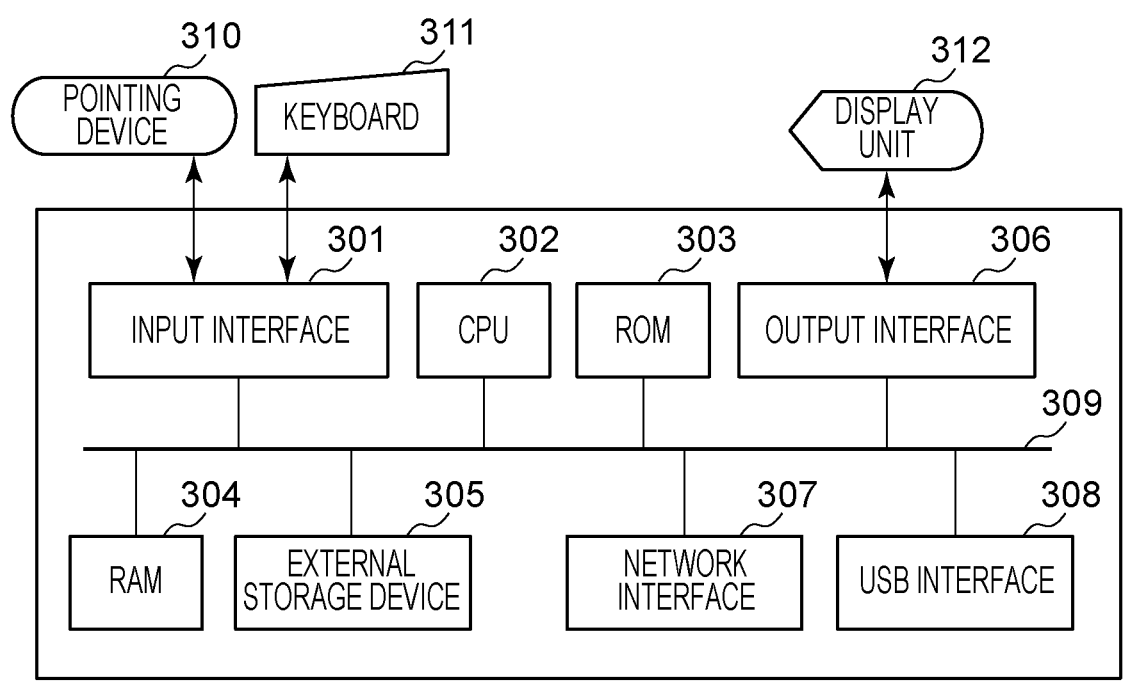
FIG. 3 is a hardware configuration diagram of a printing apparatus according to one embodiment.

FIG. 3 is a diagram illustrating an example hardware configuration of the information processing apparatuses 104 and 105. Each of the information processing apparatuses 104 and 105 includes an input interface 301, a CPU 302, a ROM 303, a RAM 304, an external storage device 305, such as a hard disk drive (HDD), an output interface 306, a network interface 307, and a USB interface 308. These components are interconnected via a system bus 309.

The input interface 301 is an interface that controls connection to input devices including a pointing device 310, such as a mouse, and a keyboard 311. The output interface 306 is an interface that controls connection to a display unit 312, such as a liquid crystal display. The network interface 307 is an interface that controls connection to a wireless LAN via the access point 106 or connection to a wired LAN via the wired LAN cable 107. The USB interface 308 is an interface that controls USB connection via a USB cable.

The ROM 303 stores an initialization program, and the external storage device 305 stores a group of applications, an OS, a printer driver, and various other data. The RAM 304 is used as a work memory when the CPU 302 executes various programs. The hardware configuration described above is an example, and the hardware configuration of the information processing apparatuses 104 and 105 is not limited to that in the example described above.

Figure 4:
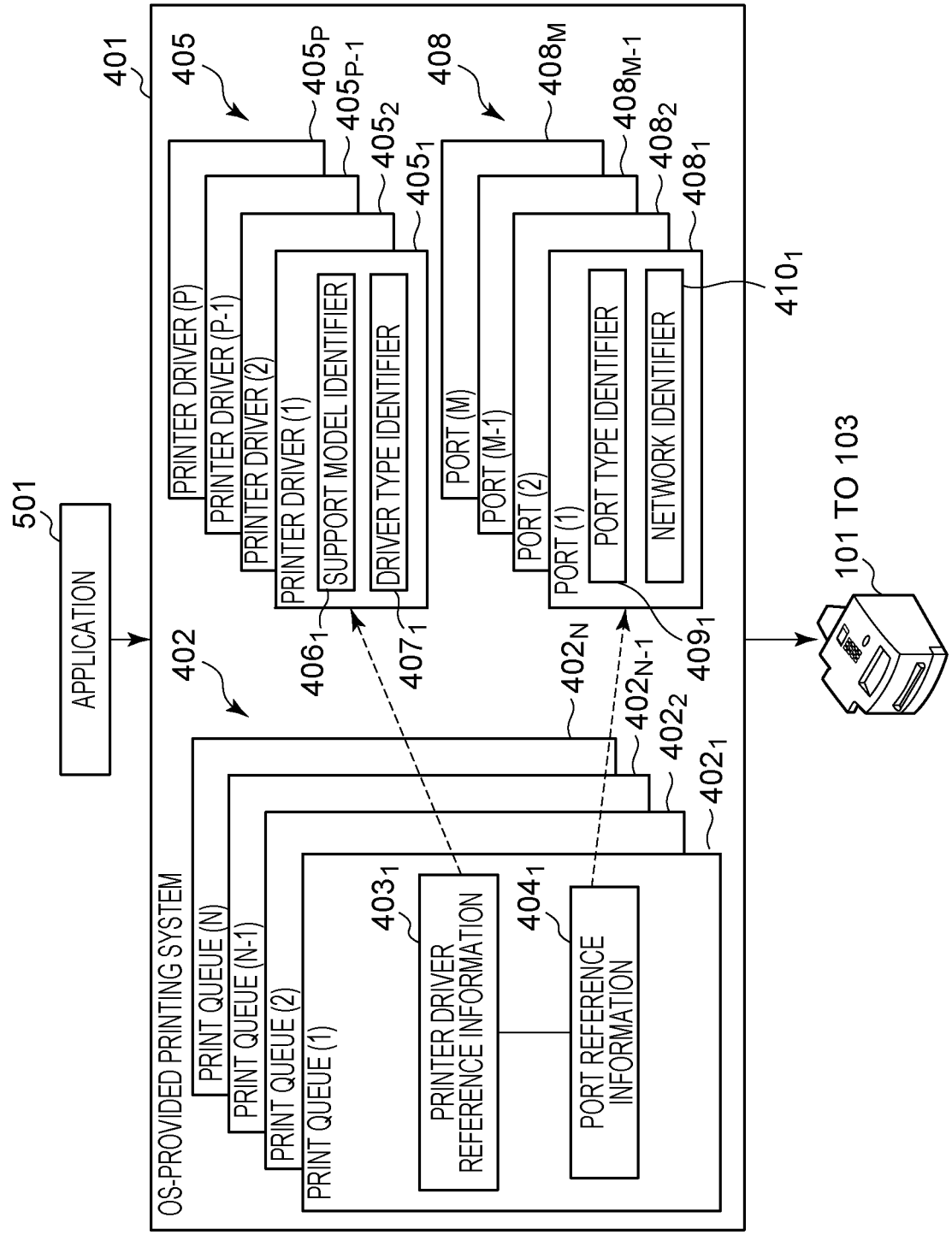
FIG. 4 is a software configuration diagram of the information processing apparatus according to one embodiment.

FIG. 4 is a diagram illustrating a software configuration of the information processing apparatuses 104 and 105 according to this embodiment. The information processing apparatus 104 includes an application 501 executable in the information processing apparatus 104. The application 501 is software for recovery of destination port setting in a print queue for which the transmission of print data to the printing apparatuses 101 to 103 is disabled due to failed destination port setting. The application 501 inquires about an available print queue 402 through a printing system 401 provided by the OS and accesses a suitable print queue $402_n$ (n is any one of 1 to N) based on the result of the inquiry.

Further, the application 501 inquires about an available printer driver 405 through the printing system 401 and accesses a suitable printer driver $405_p$ (p is any one of 1 to P) based on the result of the inquiry. The printer driver $405_p$ includes identifiers, namely, a support model identifier $406_p$ including the model name of a printing apparatus, and a driver type identifier $407_p$, such as GDI (Graphical Device Interface), XPS (Extended Markup Language (XML) Paper Specification), or FAX (facsimile).

The application 501 inquires about an available port 408 through the printing system 401 and accesses a suitable port $408_m$ (m is any one of 1 to M) based on the result of the inquiry. The port $408_m$ includes a port type identifier $409_m$, such as USB, TCP/IP, or WSD, and a network identifier $410_m$, such as an IP address or a host name.

Each print queue $402_n$ (n is any one of 1 to N)) is associated with a printer driver and a port. The print queue $402_n$ contains printer driver reference information 403 and port reference information 404 for identifying the associated printer driver and port, respectively.

In FIG. 4, as an example, the printer driver reference information $403_1$ is associated with the printer driver $405_1$, and the port reference information $404_1$ is associated with the port $408_1$. The pieces of printer driver reference information $403_1$ to $403_N$ are associated with the printer drivers $405_1$ to $405_P$, respectively, and the pieces of port reference information $404_1$ to $404_N$ are associated with the ports $408_1$ to $408_M$, respectively. In this embodiment, each port is sometimes referred to as port setting information. The application 501 can refer to and acquire the support model identifier $406_p$ and the driver type identifier $407_p$, which are setting information of the printer driver $405_p$ identified by the printer driver reference information $403_n$ included in the print queue $402_n$. Further, the application 501 can refer to and acquire the port type identifier $409_m$ and the network identifier $410_m$, which are setting information of the port $408_m$ identified by the port reference information $404_n$ included in the print queue 402n.

When the port type identifier $409_m$ indicates WSD, the port $408_m$ is defined as a "WSD port". The network identifier $410_m$ of the port $408_m$ defined as a "WSD port" contains the UUID of a printing apparatus.

When the port type identifier $409_m$ indicates TCP/IP and the network identifier $410_m$ indicates an IP address, the port $408_m$ is defined as a "fixed IP address port". When the port type identifier $409_m$ indicates TCP/IP and the network identifier $410_m$ indicates a DNS or LLMNR host name, the port $408_m$ is defined as a "host name port". In this embodiment, the ports in the information processing apparatuses 104 and 105 are each classified as any one of the "WSD port", the "fixed IP address port", and the "host name port" described above. However, the information processing apparatuses 104 and 105 may include any other type of port.

Configuration of Application

Figure 5:
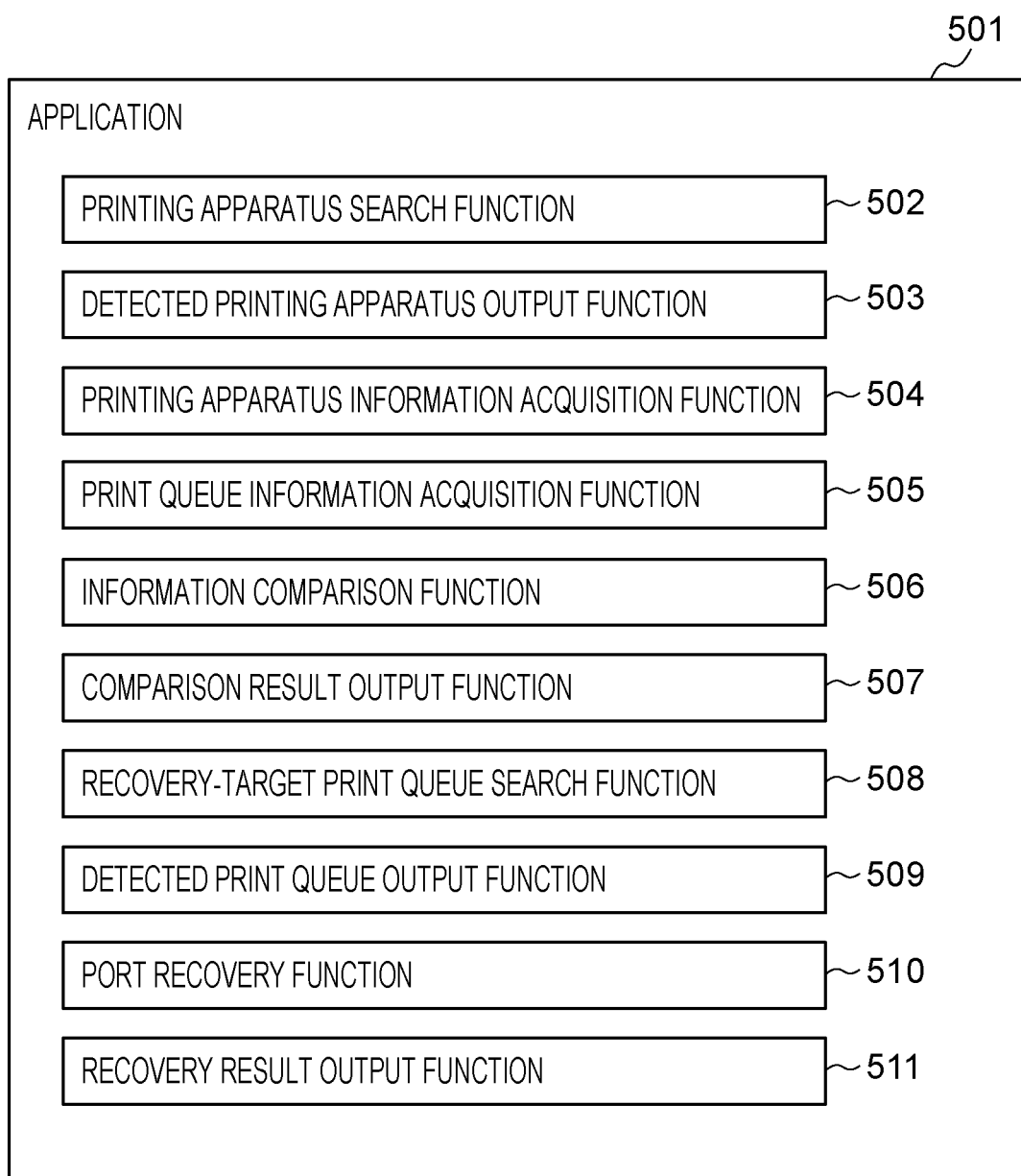
FIG. 5 is a functional configuration diagram of an application according to one embodiment.

FIG. 5 is a block diagram illustrating functions implemented by, for example, the CPU 302 of each of the information processing apparatuses 104 and 105 reading and executing the application 501 stored in the external storage device 305. The application 501 includes a printing apparatus search function 502, a detected printing apparatus output function 503, a printing apparatus information acquisition function 504, a print queue information acquisition function 505, an information comparison function 506, a comparison result output function 507, a recovery-target print queue search function 508, a detected print queue output function 509, a port recovery function 510, and a recovery result output function 511, as an example. The CPU 302 uses the functions 502 to 511 of the application 501 to execute processes described below. In this embodiment, a port recovery process is a process for restoring communication with the user's desired printing apparatus using the print queue $402_n$. The user starts a document creation application or a spreadsheet application, different from the application 501, to generate application data, selects a print queue for the desired printing apparatus, and attempts an instruction to perform printing. Depending on the setting information in the print queue selected by the user, communication with the desired printing apparatus may be disabled. The application 501 is used to address this situation.

Process Flow

The following describes a flow of processes executed by the information processing apparatuses 104 and 105. The example processes presented below may be used alone or in combination.

The processes described below are implemented by, for example, the CPU 302 loading a program corresponding to the application 501 stored in the external storage device 305 onto the RAM 304 and executing the program.

First Embodiment

The flow of the process of the application 501 according to a first embodiment will be described with reference to a flowchart illustrated in FIG. 6. In this embodiment, the application 501 is assumed to be executed on the information processing apparatus 104.

First, in S601, the CPU 302 searches for and detects printing apparatuses connected to a network to which the information processing apparatus 104 is currently connected. The printing apparatuses may be searched for by using, for example, a device search function based on the TCP/IP protocol such as the Simple Network Management Protocol (SNMP). Upon detection of printing apparatuses, then, in S602, the CPU 302 displays a list of the detected printing apparatuses on the display unit 312 in a user-selectable format. An example user interface (UI) screen that displays the list is illustrated in FIG. 7. In FIG. 7, the user clicks on the checkbox at the left end of a row corresponding to a printing apparatus for which recovery is to be performed, that is, a printing apparatus with which communication is to be restored, and then clicks a "next" button 701. In this embodiment, the printing apparatus 101 is assumed to be selected.

Upon detection of pressing of the "next" button 701, then, in S603, the CPU 302 acquires detailed network setting information of the selected printing apparatus 101. For example, the IP address, the MAC address, the serial number, the model name, and the like of the printing apparatus 101 are acquired. These pieces of information have been acquired via a network in S601 and are held in a memory of the information processing apparatus 104. The CPU 302 acquires from the memory the information corresponding to the selected printing apparatus 101 to implement the processing of S603. The CPU 302 may acquire these pieces of information via a network in S603.

Then, in S604, the CPU 302 acquires setting information in all the print queues 402 registered in the information processing apparatus 104. For example, the CPU 302 acquires the support model identifier $406_p$ and the driver type identifier $407_p$ from the printer driver reference information $403_n$ set in the print queue $402_n$. The CPU 302 further acquires the port type identifier $409_m$ and the network identifier $410_m$ from the port reference information $404_n$. The network setting information of the printing apparatus 101 acquired in S603 includes information corresponding to at least some elements of the setting information in the print queue $402_n$ acquired in S604. For example, the model name of the printing apparatus 101 corresponds to the support model identifier $406_p$. The IP address of the printing apparatus 101 corresponds to the network identifier $410_m$ when the port $408_m$ identified by the port reference information $404_n$ is a fixed IP address port. If the series of processing operations of S601 to S603 and the processing of S604 are executed in reverse order, similar results are obtained.

Then, the CPU 302 sequentially compares the setting information in the print queues $402_1$ to $402_N$ acquired in S604 with the network setting information of the printing apparatus 101 acquired in S603 and determines whether these pieces of information match (S605). The processing of S605 will be described in detail below with reference to a flowchart illustrated in FIG. 8.

Figure 9A:
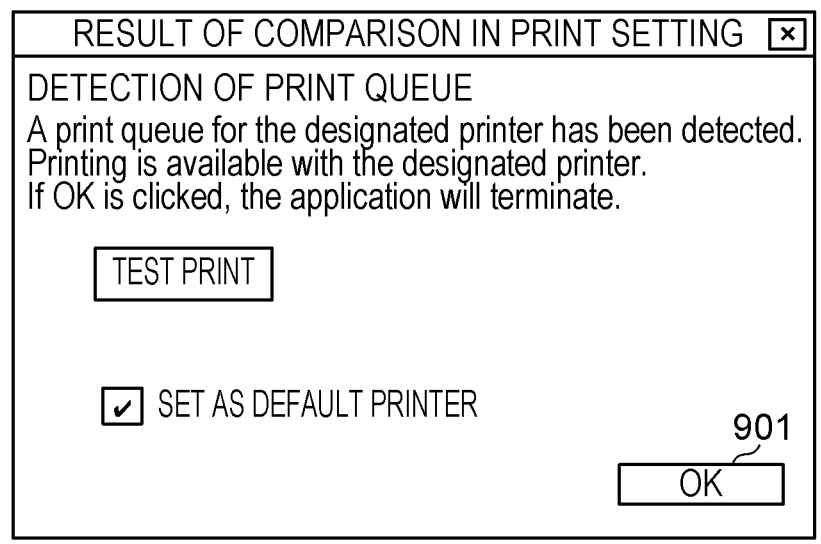
FIG. 9A, FIG. 9B and FIG. 9C illustrate example UI screens of the application according to one embodiment.

As a result of information comparison in S605, if it is determined that the information processing apparatus 104 has a print queue of print jobs printable by the printing apparatus 101 (YES in S606), in S607, the CPU 302 displays the presence of a print queue of printable print jobs on the display unit 312. An example UI screen displayed at this time is illustrated in FIG. 9A. In FIG. 9A, as an example, the CPU 302 informs the user that a print queue of print jobs printable by the printing apparatus 101 has been detected, and an "OK" button 901 is displayed. Upon detection of pressing of the "OK" button 901, the application 501 terminates the program. The screen illustrated in FIG. 9A includes a "test print" button. When the user presses the "test print" button, the CPU 302 generates print data for a test print using the printer driver associated with the print queue for which YES is determined in S606. Then, the CPU 302 transmits the print data for the test print to the printing apparatus 101 using the port associated with the print queue for which YES is determined in S606. The screen illustrated in FIG. 9A also includes a checkbox for accepting a designation of setting as a default printer. If the print queue for which YES is determined in S606 is not designated as a print queue for a default printer, the screen illustrated in FIG. 9A including the checked checkbox as the initial value is displayed. On the other hand, if the print queue for which YES is determined in S606 has been designated as a print queue for a default printer, the checkbox and the "set as default printer" message may be hidden. When the "OK" button 901 is pressed in the state illustrated in FIG. 9A, the print queue for which YES is determined in S606 is managed in the OS as a print queue for a default printer.

On the other hand, if it is determined, as a result of information comparison in S605, that the information processing apparatus 104 has no print queue of print jobs printable by the printing apparatus 101 (NO in S606), a process described hereinafter is performed. In S608, the CPU 302 detects a print queue that is a recovery target (hereinafter referred to as a recovery-target print queue) from among all the print queues 402 in the information processing apparatus 104. The processing of S608 will be described in detail with reference to a flowchart illustrated in FIG. 10.

Figure 9B:
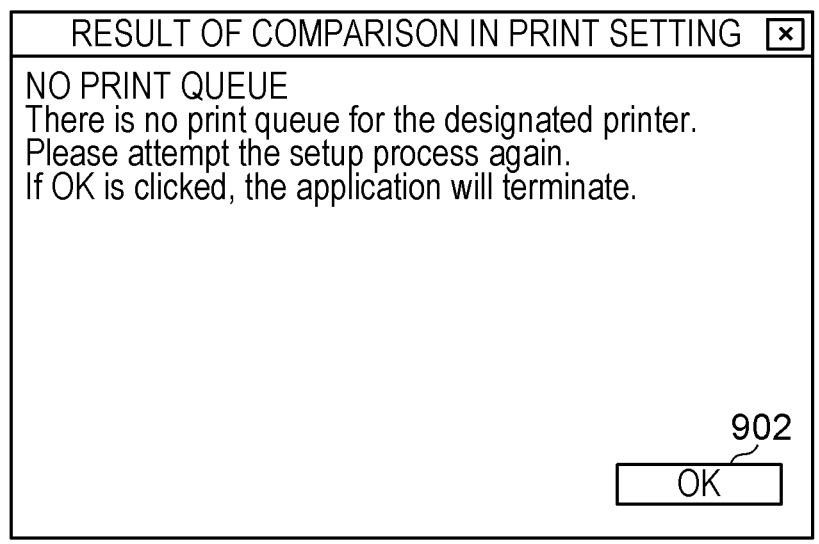

As a result of detection in S608, if the CPU 302 detects no recovery-target print queue (NO in S609), in S610, the CPU 302 displays the absence of a print queue of printable print jobs on the display unit 312. An example UI screen displayed at this time is illustrated in FIG. 9B. In FIG. 9B, as an example, the CPU 302 informs the user that detection of a print queue for the printing apparatus 101 has failed, and an "OK" button 902 is displayed. Upon detection of pressing of the "OK" button 902, the application 501 terminates the program. In this case, the user generates a new print queue for the printing apparatus 101.

Figure 9C:
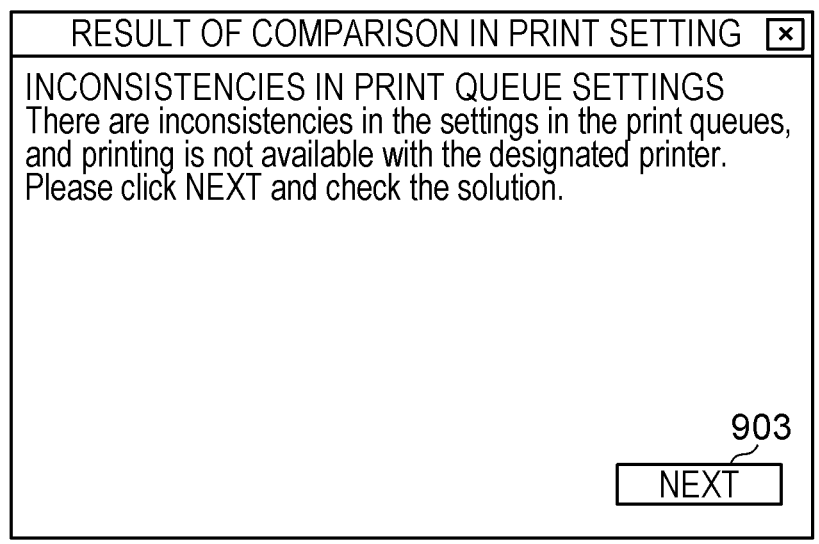
Figure 11A:
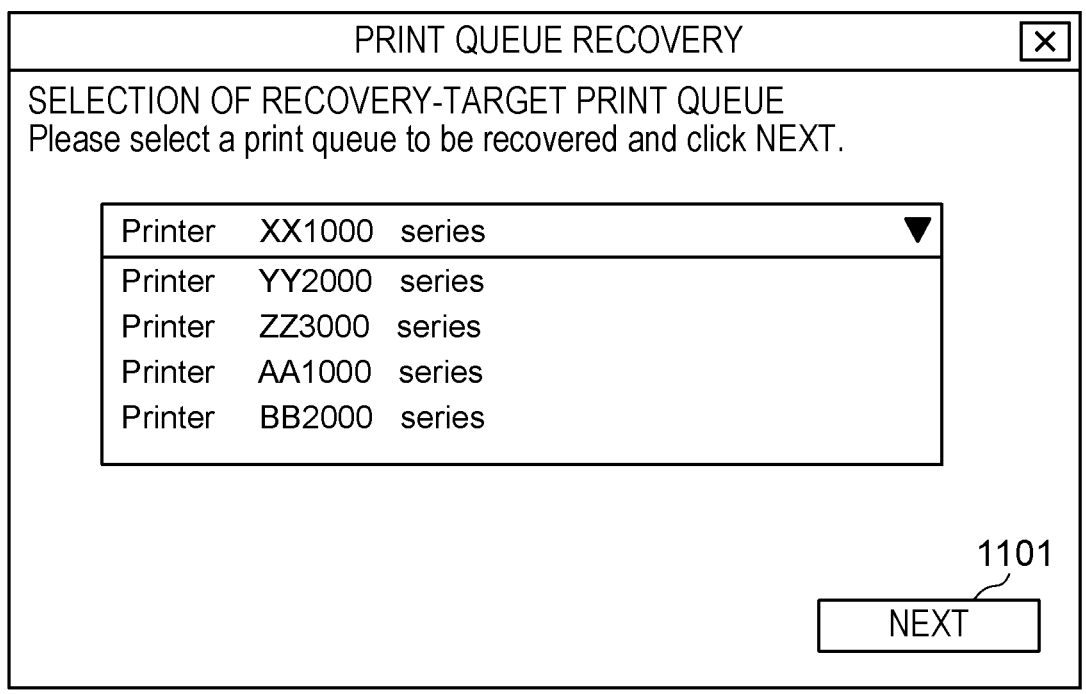
FIG. 11A and FIG. 11B illustrate example UI screens of the application according to one embodiment.
Figure 11B:
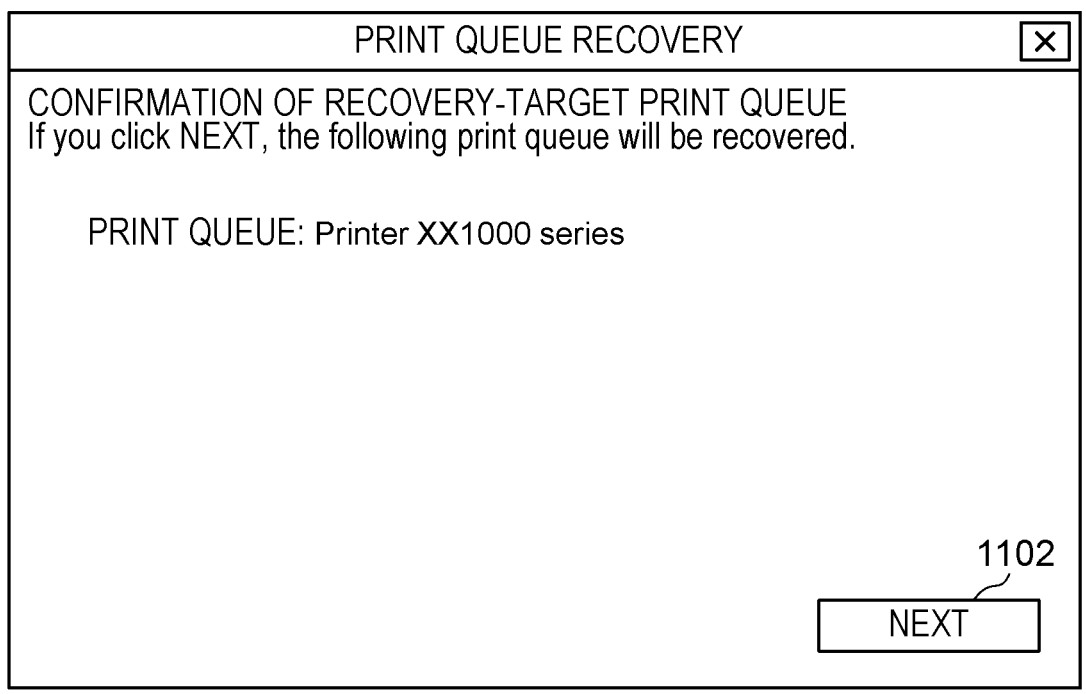

On the other hand, as a result of detection in S608, if the CPU 302 detects one or more recovery-target print queues (YES in S609), in S611, the CPU 302 performs a display control process to display inconsistencies in the settings in the print queue(s) on the display unit 312. An example UI screen displayed at this time is illustrated in FIG. 9C. In FIG. 9C, as an example, the CPU 302 informs the user that printing is not available since there are inconsistencies in the settings in the print queue(s) for the printing apparatus 101, and a "next" button 903 is displayed. Upon detection of pressing of the "next" button 903, then, in S612, the CPU 302 displays a list of the recovery-target print queue(s) detected in S608 on the display unit 312 in a user-selectable format. An example UI screen displayed at this time is illustrated in FIG. 11A. In FIG. 11A, as an example, the CPU 302 displays recovery-target print queues in a drop-down list. On the screen, the user selects a recovery-target print queue in the drop-down list, and then clicks a "next" button 1101 on the screen. Upon detection of pressing of the "next" button 1101, the CPU 302 identifies the print queue that is a recovery target. If only one recovery-target print queue has been detected, as illustrated in FIG. 11B, the CPU 302 may display the recovery-target print queue detected in S608 in a format other than a selectable format. In FIG. 11B, the recovery-target print queue and a "next" button 1102 are displayed on the screen. Upon detection of pressing of the "next" button 1102, the CPU 302 identifies the print queue that is a recovery target. In this embodiment, the print queue $402_1$ is assumed to be selected.

Figure 12:
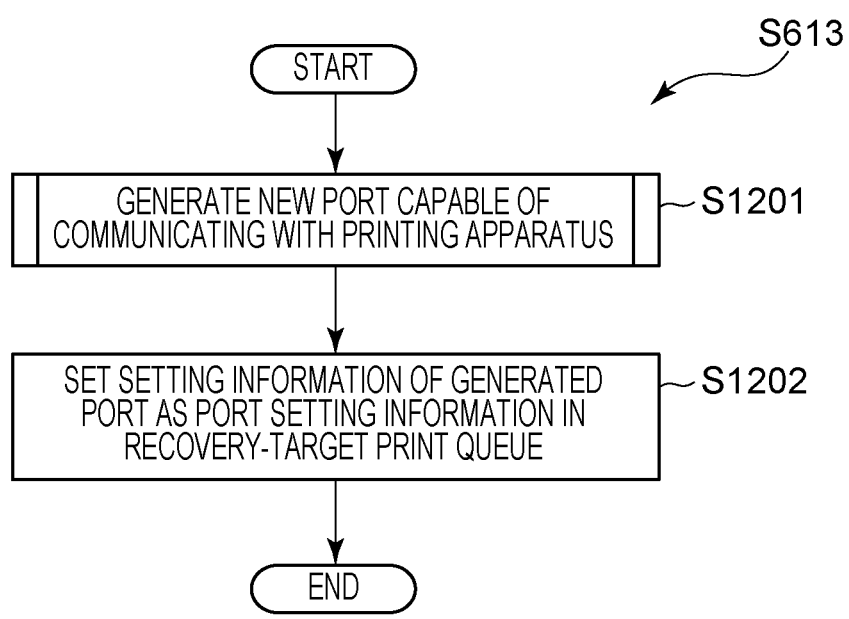
FIG. 12 is a flowchart illustrating a port recovery process according to a first embodiment according to one embodiment.

When the recovery-target print queue $402_1$ is identified, in S613, the CPU 302 performs recovery of the selected print queue $402_1$. The processing of S613 will be described in detail with reference to a flowchart illustrated in FIG. 12. When a port is generated through a process illustrated in FIG. 12 described below, the CPU 302 corrects the port reference information $404_1$ included in the recovery-target print queue $402_1$ so that the port generated in the process illustrated in FIG. 12 is referred to.

Figure 13A:
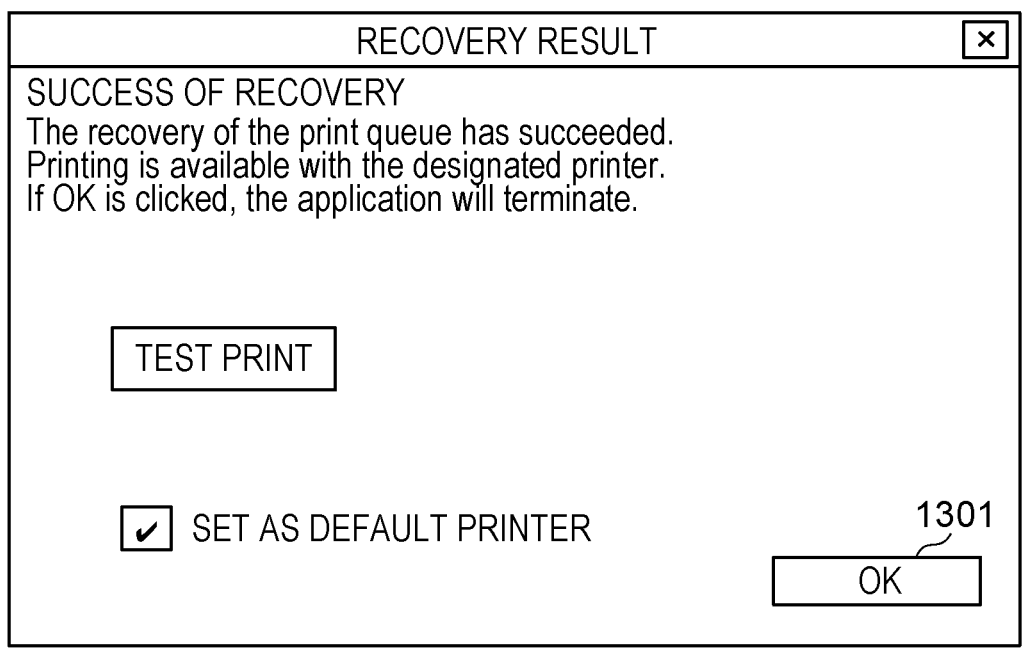
FIG. 13A and FIG. 13B illustrate example UI screens of the application according to one embodiment.
Figure 13B:
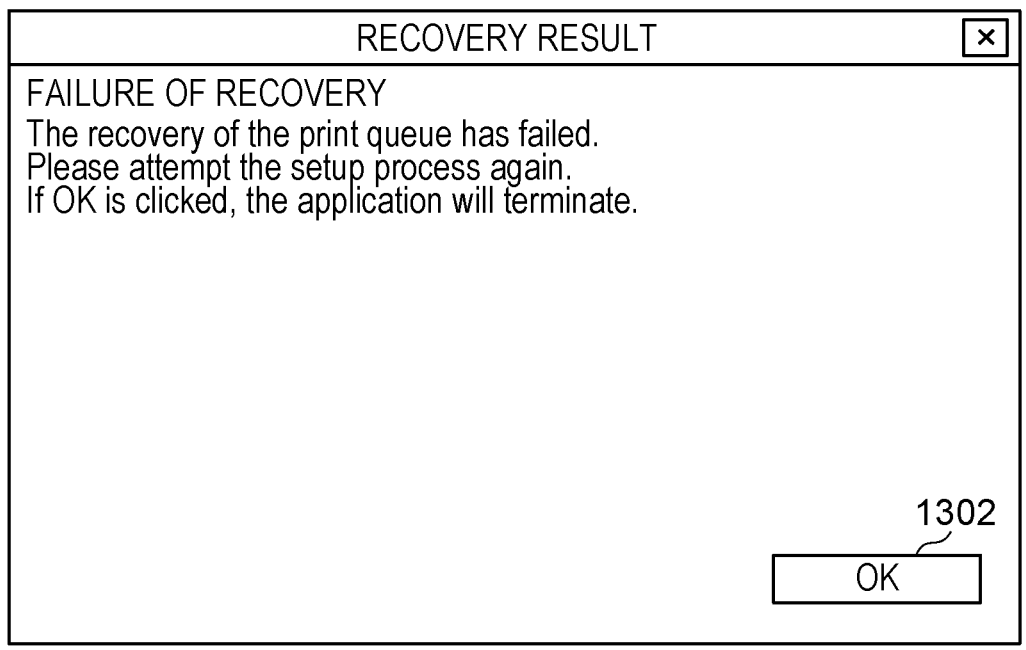

When the recovery process of the print queue $402_1$ is complete, in S614, the CPU 302 displays the result of recovery on the display unit 312. Example UI screens displayed at this time are illustrated in FIG. 13A and FIG. 13B. If a recovery failure flag described below with reference to FIG. 19 is enabled, the CPU 302 displays the screen illustrated in FIG. 13B. On the other hand, if the recovery failure flag is not enabled, the CPU 302 displays the screen illustrated in FIG. 13A.

The screen illustrated in FIG. 13A is displayed when the recovery process of the print queue $402_1$ is successful, and the screen illustrated in FIG. 13B is displayed when the recovery process of the print queue $402_1$ has failed. When the recovery process is successful, as an example, the CPU 302 informs the user that the print queue selected by the user in S612 is successfully recovered and print jobs in the print queue become printable by the printing apparatus 101, and a screen (FIG. 13A) including an "OK" button 1301 is displayed. Upon detection of pressing of the "OK" button 1301, the application 501 terminates the program. If the application 501 is executed again after the recovery process is successfully performed, in accordance with the procedure described above, it is determined that the information processing apparatus 104 has a print queue of print jobs printable by the printing apparatus 101 in S605 (YES in S606). The screen illustrated in FIG. 13A includes a checkbox for accepting a designation of setting as a default printer. For example, if the recovery-target print queue is not designated as a print queue for a default printer, the screen illustrated in FIG. 13A including the checked checkbox as the initial value is displayed. On the other hand, if the recovery-target print queue has been designated as a print queue for a default printer, the checkbox and the "set as default printer" message may be hidden. When the "OK" button 1301 is pressed in the state illustrated in FIG. 13A, the recovery-target print queue is managed in the OS as a print queue for a default printer.

In FIG. 13B, as an example, the CPU 302 informs the user that the recovery of the print queue selected by the user has failed in S612, and an "OK" button 1302 is displayed. Upon detection of pressing of the "OK" button 1302, the application 501 terminates the program.

When the recovery process described above is complete, for example, the user starts another application different from the application 501. Then, when the recovered print queue is selected and an instruction is provided to perform printing, the printer driver corresponding to the recovered print queue can generate print data based on data output from the other application and transmit the print data to the printing apparatus 101.

Figure 6:
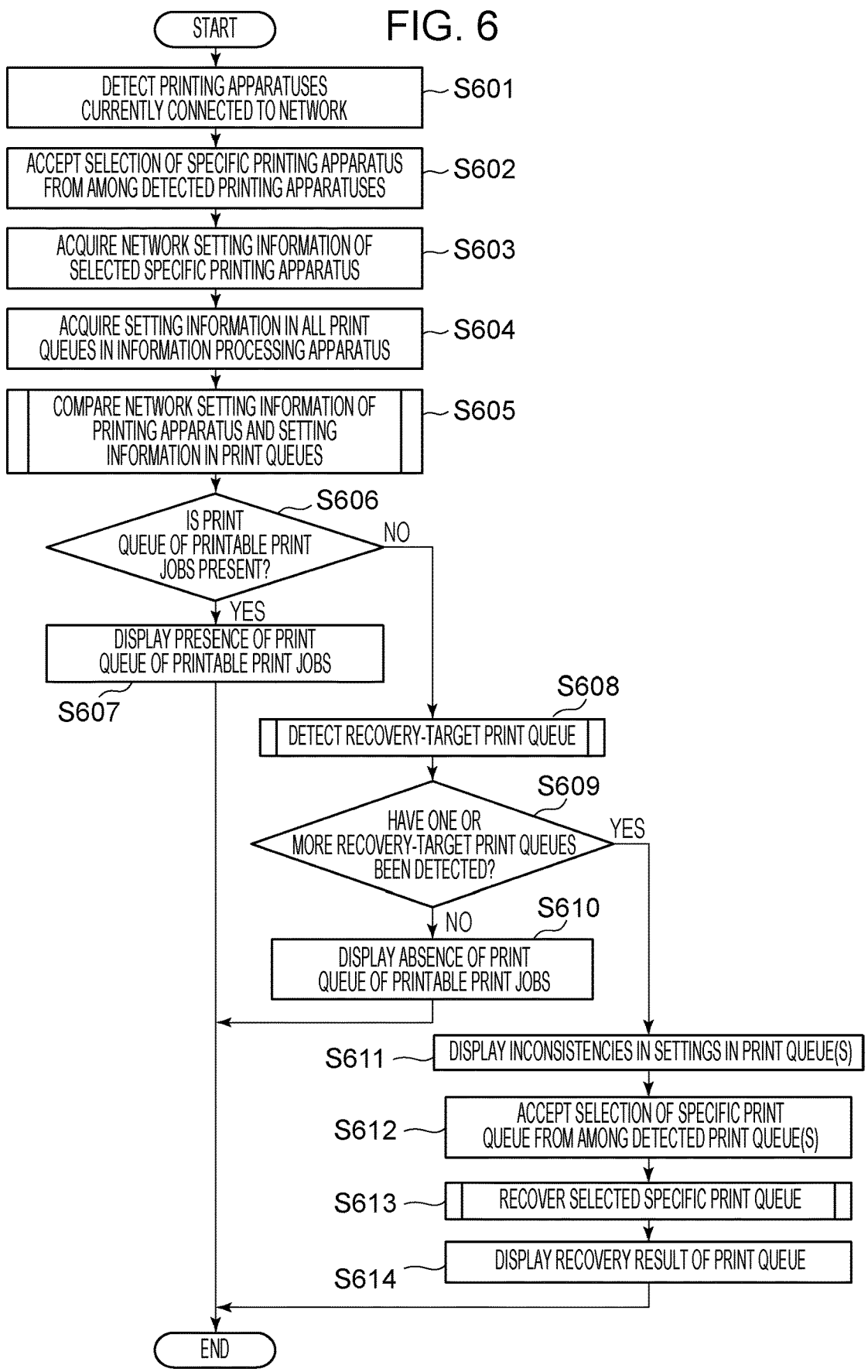
FIG. 6 is a flowchart illustrating a process executed by the information processing apparatus according to one embodiment.

FIG. 8 is a flowchart illustrating the details of the processing of S605 in FIG. 6. The CPU 302 repeatedly performs the processing of S802 to S804 described below on all the print queues 402 in the information processing apparatus 104 (S801).

First, in S802, the CPU 302 compares the model name of the printing apparatus 101 acquired in S603 and the model name included in the support model identifier $406_p$ for the print queue $402_n$ acquired in S604. If no match is found between the model name of the printing apparatus 101 and the model name included in the support model identifier $406_p$ (NO in S802), the CPU 302 determines that the selected print queue is not a print queue for the printing apparatus 101. Then, the CPU 302 selects the next print queue $402_{n+1}$ and executes the processing of S802 to S804.

On the other hand, if a match is found between the model name of the printing apparatus 101 and the model name included in the support model identifier $406_p$ (YES in S802), a process described hereinafter is performed. In S803, the CPU 302 determines whether communication with the printing apparatus 101 using the port $408_m$ corresponding to the port reference information $404_n$ set in the print queue $402_n$ is enabled. The processing of S803 will be described in detail with reference to a flowchart illustrated in FIG. 14.

If it is determined in S803 that communication with the printing apparatus 101 using the port $408_m$ is disabled (NO in S804), the CPU 302 selects the next print queue $402_{n+1}$ and executes the processing of S802 to S804.

On the other hand, if it is determined in S803 that communication with the printing apparatus 101 using the port $408_m$ is enabled (YES in S804), the CPU 302 exits the loop process. Then, in S805, the CPU 302 determines that the information processing apparatus 104 has a print queue of printable print jobs.

If none of the print queues 402 in the information processing apparatus 104 is a print queue for which YES is determined in S804, then, in S806, the CPU 302 determines that the information processing apparatus 104 has no print queue of printable print jobs.

Figure 14:
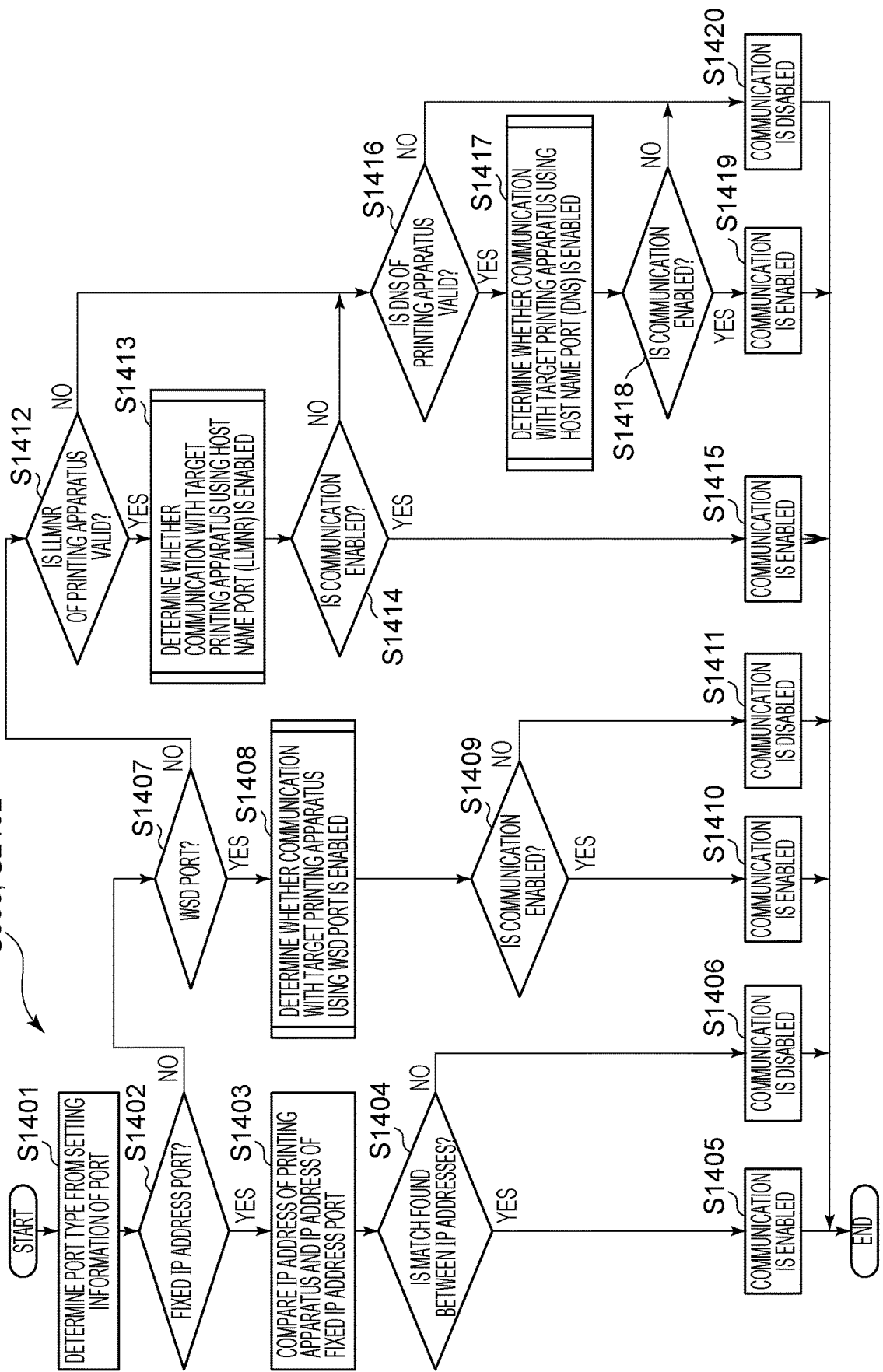
FIG. 14 is a flowchart illustrating a process of determining whether communication is enabled according to one embodiment.

FIG. 14 is a flowchart illustrating the details of the processing of S803 in FIG. 8. The processing will be described as a process using the port $408_m$.

First, in S1401, the CPU 302 determines the port type of the port $408_m$. The determination is made from the port type identifier $409_m$ and the network identifier $410_m$ set in the port $408_m$. If the port type identifier $409_m$ indicates WSD, the CPU 302 determines that the port $408_m$ is a "WSD port". If the port type identifier $409_m$ indicates TCP/IP and the network identifier $410_m$ indicates an IP address, the CPU 302 determines that the port $408_m$ is a "fixed IP address port". If the port type identifier $409_m$ indicates TCP/IP and the network identifier $410_m$ indicates a DNS or LLMNR host name, the CPU 302 determines that the port $408_m$ is a "host name port".

A process performed if it is determined in S1401 that the port type is a "fixed IP address port" (YES in S1402) will be described. In S1403, the CPU 302 compares the IP address of the printing apparatus 101 acquired in S603 and the IP address indicated by the network identifier $410_m$ in the port $408_m$ acquired in S604. If a match is found between the IP address of the printing apparatus 101 and the IP address of the port $408_m$ (YES in S1404), in S1405, the CPU 302 determines that communication with the printing apparatus 101 using the port $408_m$ is enabled.

On the other hand, if no match is found between the IP address of the printing apparatus 101 and the IP address of the port $408_m$ (NO in S1404), in S1406, the CPU 302 determines that communication with the printing apparatus 101 using the port $408_m$ is disabled.

If it is determined in S1401 that the port type is "WSD port" (NO in S1402 and YES in S1407), in S1408, the CPU 302 determines whether communication with the printing apparatus 101 using the WSD port $408_m$ is enabled. The processing of S1408 will be described in detail with reference to a flowchart illustrated in FIG. 15.

If it is determined that communication with the printing apparatus 101 using the WSD port $408_m$ is enabled (YES in S1409), in S1410, the CPU 302 determines that communication with the printing apparatus 101 using the port $408_m$ is enabled. On the other hand, if it is determined that communication with the printing apparatus 101 using the WSD port $408_m$ is disabled (NO in S1409), in S1411, the CPU 302 determines that communication with the printing apparatus 101 using the port $408_m$ is disabled.

If it is determined in S1401 that the port type is "host name port" (NO in S1402 and NO in S1407), in S1412, the CPU 302 determines whether the LLMNR function of the printing apparatus 101 acquired in S603 is valid. If the LLMNR function of the printing apparatus 101 is valid (YES in S1412), in S1413, the CPU 302 determines whether communication with the printing apparatus 101 using the host name port $408_m$ is enabled. The processing of S1413 will be described in detail with reference to a flowchart illustrated in FIG. 16.

If it is determined that communication with the printing apparatus 101 using the host name port $408_m$ is enabled (YES in S1414), in S1415, the CPU 302 determines that communication with the printing apparatus 101 using the port $408_m$ is enabled. On the other hand, if it is determined that communication with the printing apparatus 101 using the host name port $408_m$ is disabled (NO in S1414) or if the LLMNR function of the printing apparatus 101 is invalid (NO in S1412), a process described hereinafter is performed. In S1416, the CPU 302 determines whether the DNS function of the printing apparatus 101 acquired in S603 is valid.

If the DNS function of the printing apparatus 101 is valid (YES in S1416), in S1417, the CPU 302 determines whether communication with the printing apparatus 101 using the host name port $408_m$ is enabled. The processing of S1417 will be described in detail with reference to a flowchart illustrated in FIG. 16.

If it determined that communication with the printing apparatus 101 using the host name port $408_m$ is enabled (YES in S1418), in S1419, the CPU 302 determines that communication with the printing apparatus 101 using the port $408_m$ is enabled. On the other hand, if it is determined that communication with the printing apparatus 101 using host name port $408_m$ is disabled (NO in S1418) or if the DNS function of the printing apparatus 101 is invalid (NO in S1416), a process described hereinafter is performed. In S1420, the CPU 302 determines that communication with the printing apparatus 101 using the port $408_m$ is disabled. In the process described above, in S1412 and S1416, the CPU 302 determines whether the LLMNR and DNS functions of the printing apparatus 101 are valid. As a result, it is possible to rapidly determine whether communication using a host name port is enabled when the LLMNR or DNS function of the printing apparatus 101 is invalid, as compared with the case where whether the LLMNR and DNS functions of the printing apparatus 101 are valid is not determined. For example, it is assumed that the LLMNR function of the printing apparatus 101 is invalid and that the DNS function of the printing apparatus 101 is valid. If the processing of S1412 is not executed, first, the CPU 302 determines whether communication with the printing apparatus 101 using LLMNR is enabled. Since the LLMNR function of the printing apparatus 101 is invalid, it is determined that communication is disabled. Then, the CPU 302 determines whether communication with the printing apparatus 101 using DNS is enabled. That is, it is not known whether the LLMNR function of the printing apparatus 101 is invalid, and thus the CPU 302 may make an extra determination as to whether communication with the printing apparatus 101 using LLMNR is enabled. This extra determination process may prolong the determination of whether communication is enabled. The process illustrated in FIG. 14 addresses this issue by executing the processing of S1412 and S1416. Note that even if the determination of S1412 and S1416 is not performed, NO is determined in S1414 and S1418 if the LLMNR and DNS functions of the printing apparatus 101 are invalid. As a result, it is determined that communication with the printing apparatus 101 using the host name port $408_m$ based on LLMNR or DNS is disabled. That is, the same result is obtained.

Figure 15:
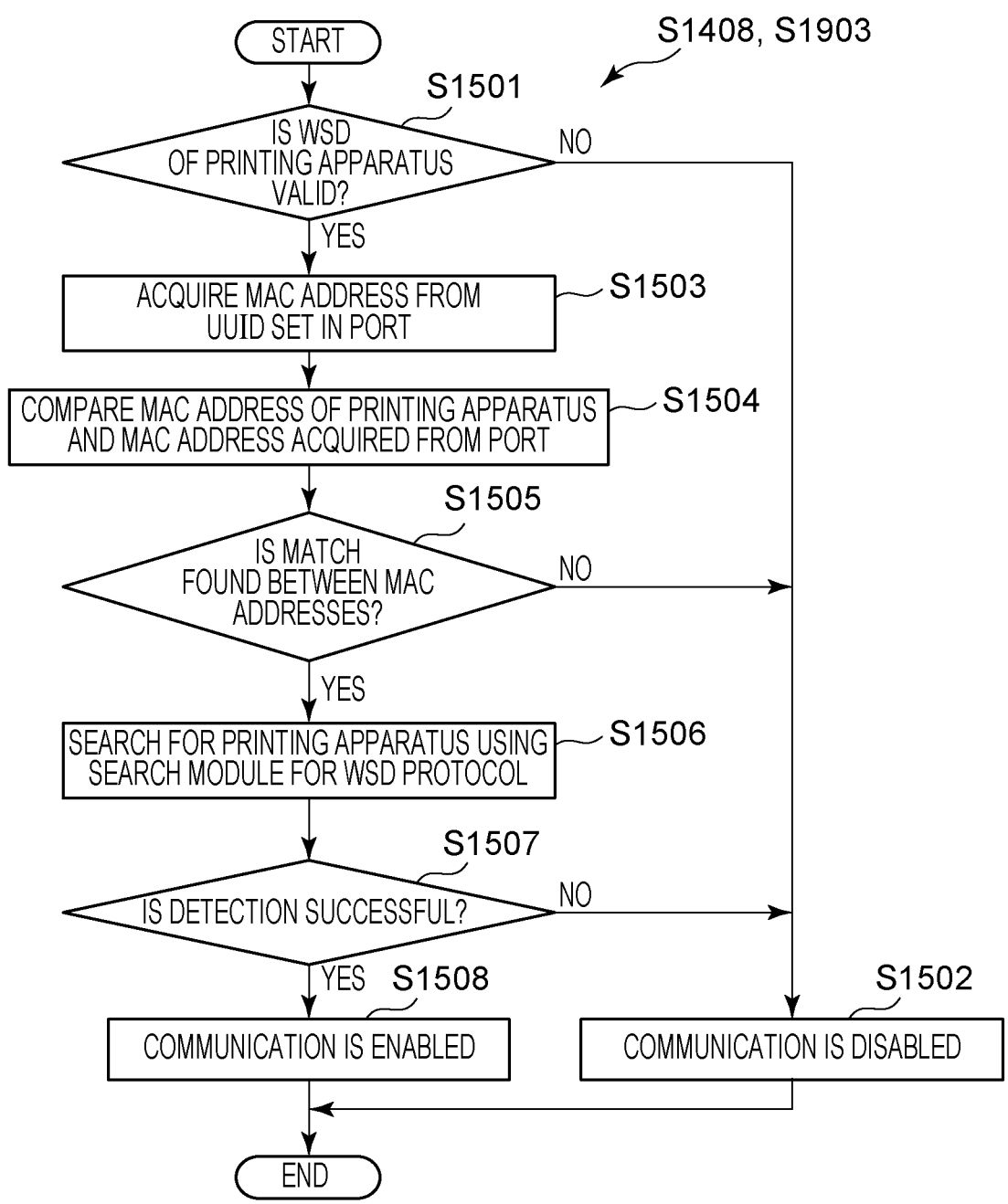
FIG. 15 is a flowchart illustrating a process of determining whether communication using a Web Services on Devices (WSD) port is enabled according to one embodiment.

FIG. 15 is a flowchart illustrating the details of the processing of S1408 in FIG. 14. First, in S1501, the CPU 302 determines whether the WSD function of the printing apparatus 101 acquired in S603 is valid. If the WSD function of the printing apparatus 101 is invalid (NO in S1501), in S1502, the CPU 302 determines that communication with the printing apparatus 101 using the WSD port $408_m$ is disabled. On the other hand, if the WSD function of the printing apparatus 101 is valid (YES in S1501), in S1503, the CPU 302 acquires the MAC address from the UUID set in the network identifier $410_m$ in the WSD port $408_m$. Then, in S1504, the CPU 302 compares the MAC address of the printing apparatus 101 acquired in S603 and the MAC address acquired in S1503. If no match is found between these MAC addresses (NO in S1505), in S1502, the CPU 302 determines that communication with the printing apparatus 101 using the WSD port $408_m$ is disabled. On the other hand, if a match is found between the MAC address of the printing apparatus 101 and the MAC address acquired in S1503 (YES in S1505), a process described hereinafter is performed. In S1506, the CPU 302 searches for the printing apparatus 101 via unicast communication based on the UUID set in the network identifier $410_m$ using a search module supporting the WSD protocol.

If the printing apparatus 101 is not detected in S1506 (NO in S1507), in S1502, the CPU 302 determines that communication with the printing apparatus 101 using the WSD port $408_m$ is disabled. On the other hand, if the printing apparatus 101 is detected in S1506 (YES in S1507), in S1508, the CPU 302 determines that communication with the printing apparatus 101 using the WSD port $408_m$ is enabled. The information comparison function 506 determines whether the WSD function of the printing apparatus 101 is valid in S1501, which makes it possible to rapidly determine whether communication using a WSD port is enabled when the WSD function of the printing apparatus 101 is invalid, as compared with the case where whether the WSD function of the printing apparatus 101 is valid is not determined. Note that even if this determination is not performed, the printing apparatus 101 is not found in S1506 if the WSD function of the printing apparatus 101 is invalid. Finally, in S1502, the CPU 302 determines that communication with the printing apparatus 101 using the WSD port $408_m$ is disabled.

FIG. 16 is a flowchart illustrating the details of the processing of S413 and S1417 in FIG. 14. First, in S1601, the CPU 302 compares the LLMNR name (in the case of S1413) or DNS name (in the case of S1417) of the printing apparatus 101 acquired in S603 and the host name set in the network identifier $410_m$ in the host name port $408_m$. If no match is found (NO in S1602), in S1603, the CPU 302 determines that communication with the printing apparatus 101 using the host name port $408_m$ is disabled. On the other hand, if a match is found between the LLMNR name or DNS name of the printing apparatus 101 and the host name set in the network identifier $410_m$ in the host name port $408_m$ (YES in S1602), the process in FIG. 16 proceeds to S1604. Then, the CPU 302 attempts name resolution using the host name set in the network identifier $410_m$ in the host name port $408_m$. For example, the CPU 302 designates the host name set in the network identifier $410_m$ and transmits an inquiry command of the IP address via broadcasting over a network. As a result, the printing apparatus 101 corresponding to the host name transmits the IP address as a response command. If the transmission of the inquiry command and the reception of the response command are correctly executed, name resolution is successful, and the CPU 302 can acquire the IP address of the printing apparatus 101.

If name resolution has failed (NO in S1605), in S1603, the CPU 302 determines that communication with the printing apparatus 101 using the host name port $408_m$ is disabled. On the other hand, if name resolution is successful (YES in S1605), a process described hereinafter is performed. In S1606, the CPU 302 compares the IP address of the printing apparatus 101 acquired in S603 and the IP address acquired through name resolution using the host name set in the network identifier $410_m$ in the host name port $408_m$ in S1604. If a match is found between these IP addresses (YES in S1607), in S1608, the CPU 302 determines that communication with the printing apparatus 101 using the host name port $408_m$ is enabled. On the other hand, if no match is found between the IP address of the printing apparatus 101 and the IP address of the host name port $408_m$ (NO in S1607), in S1603, the CPU 302 determines that communication with the printing apparatus 101 using the host name port $408_m$ is disabled.

Figure 10:
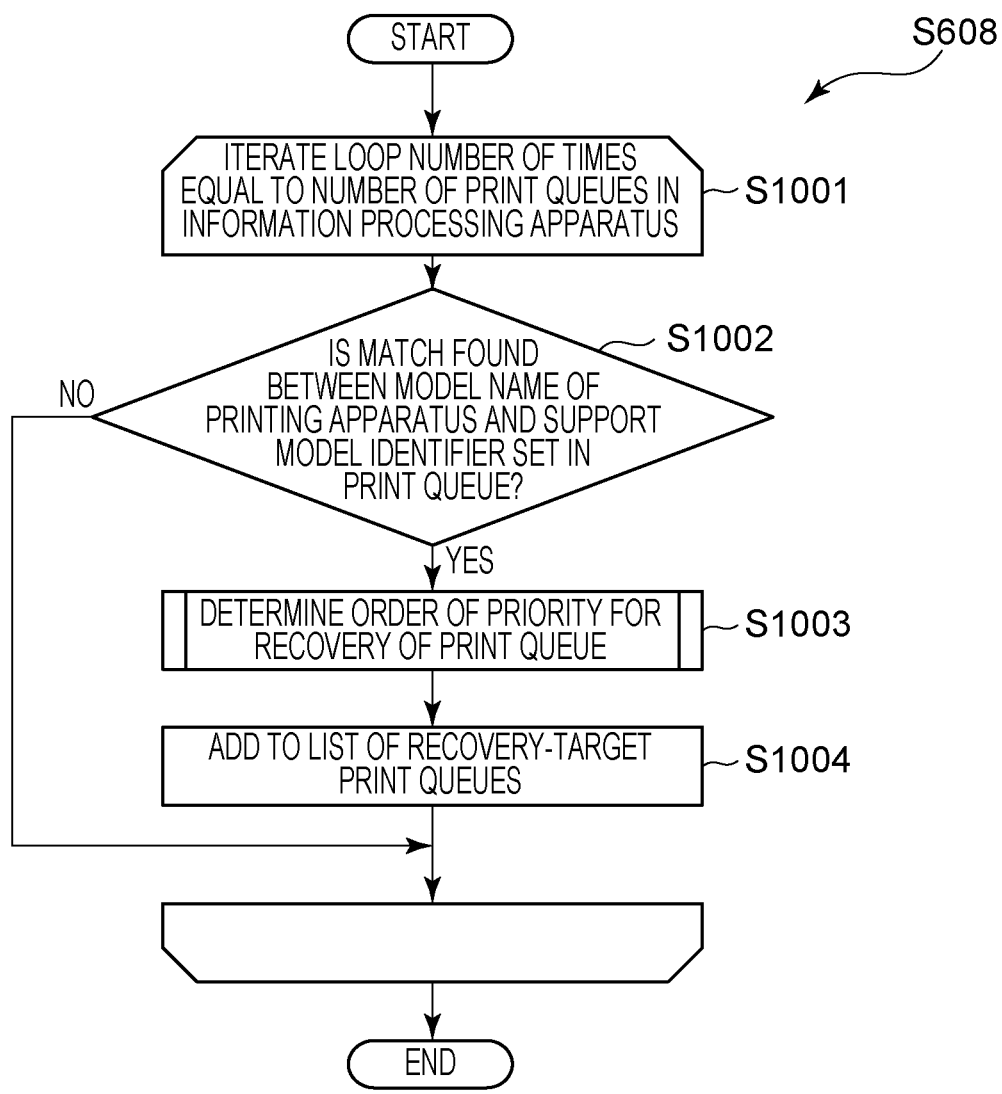
FIG. 10 is a flowchart illustrating a process of determining a recovery-target print queue according to one embodiment.

FIG. 10 is a flowchart illustrating the details of the processing of S608 in FIG. 6. The CPU 302 repeatedly performs the processing of S1002 to S1004 presented below on all the print queues 402 in the information processing apparatus 104 (S1001).

First, in S1002, the CPU 302 compares the model name of the printing apparatus 101 acquired in S603 and the model name (name information) included in the support model identifier $406_p$ in the print queue $402_n$ acquired in S604. If no match is found between the model name of the printing apparatus 101 and the model name included in the support model identifier 406p (NO in S1002), the CPU 302 determines that the print queue $402_n$ is not a print queue for the printing apparatus 101, and executes the processing of S1002 to S1004 on the next print queue $402_{n+1}$. On the other hand, if a match is found between the model name of the printing apparatus 101 and the model name included in the support model identifier $406_p$ (YES in S1002), in S1003, the CPU 302 determines the order of priority for recovery of the print queue $402_n$. The processing of S1003 will be described in detail with reference to a flowchart illustrated in FIG. 17. After the order of priority for recovery of the print queue $402_n$ is determined, then, in S1004, the CPU 302 adds the print queue $402_n$ to a list of recovery-target print queues, and executes the processing of S1002 to S1004 on the next print queue $402_{n+1}$. After the processing operations described above are performed on all the print queues 402 in the information processing apparatus 104, the process ends. The order of priority set in S1003 is used to determine the display order in FIG. 11A. For example, print queues are displayed in sequence from the top in FIG. 11A in accordance with the order of priority. In some cases, a plurality of print queues are added to the list in S1004 through the process illustrated in FIG. 10. For example, an XPS print queue for the printing apparatus 101, a GDI print queue for the printing apparatus 101, and a FAX print queue for the printing apparatus 101 may be managed in the information processing apparatus 104. In such a case, a plurality of print queues are added to the list in S1004.

FIG. 17 is a flowchart illustrating the details of the processing of S1003 in FIG. 10. In this embodiment, the order of priority for recovery of print queues is determined by parameters val1 to val3 relating to the print queues. The parameters val to val3 are value parameters having an initial value of "0", and satisfy a relation of val1>val2>val3 in terms of the degree of contribution to the order of priority for recovery. In this embodiment, as described below, a default printer and the like are used as parameters for determining the order of priority for recovery. Alternatively, any other parameter may be used. Parameters not presented in this embodiment, such as a parameter relating to a port set in a print queue, may be used. In addition, the number of parameters is not limited to that presented in this embodiment.

First, in S1701, the CPU 302 determines whether the determination-target print queue $402_n$ is set as a print queue that is typically used for printing (hereinafter referred to as "default printer") by using the function of the OS. If the "default printer" is set for the determination-target print queue $402_n$ (YES in S1701), in S1702, the CPU 302 sets the parameter val1 for the determination-target print queue $402_n$ to "1". On the other hand, if the "default printer" is not set for the determination-target print queue $402_n$ (NO in S1701), the value of the parameter val1 remains at the initial value of "0".

Then, in S1703, the CPU 302 determines whether any print job is left in the print queue $402_n$. If a print job is left (YES in S1703), the CPU 302 sets the parameter val2 for the determination-target print queue $402_n$ to "1". On the other hand, if no print job is left in the print queue $402_n$ (NO in S1703), the value of the parameter val2 remains at the initial value of "0".

Then, in S1705, the CPU 302 determines whether the print setting information in the print queue $402_n$, such as the print paper type and the print paper size, has been changed from the initial setting. In this embodiment, if the print setting information of the determination-target print queue $402_n$ has been changed from the initial setting, a higher priority is set to the print queue $402_n$ than any other print queue. This is because if the user has changed the print setting information from the initial setting, it is predicted that the user will frequently use the determination-target print queue $402_n$. If the print setting information has been changed from the initial setting (YES in S1705), the CPU 302 adds "1" to the value of the parameter val2 for the determination-target print queue $402_n$. On the other hand, if the print setting information in the print queue $402_n$ has not been changed from the initial setting (NO in S1705), the value of the parameter val2 remains unchanged. The initial setting for the print setting information of a print queue may be acquired from, as an example, using a table held in the application 501 for the initial setting of each model. As an alternative method, the application 501 may store initial setting in the ROM 303 or the external storage device 305 in the information processing apparatus 104 at a timing when the print queue $402_n$ is generated, such as when a printer driver is installed.

Then, the CPU 302 determines the value of the parameter val3 from the driver type identifier $407_p$ in the print queue $402_n$ acquired in S604. In this embodiment, as an example, print queues are arranged in order of priority, from highest to lowest, based on the driver type identifier $407_p$, such that "GDI">"XPS">"FAX", in terms of use rate. If the driver type identifier $407_p$ in the print queue $402_n$ indicates "GDI" (YES in S1707), in S1708, the CPU 302 sets the value of the parameter val3 for the determination-target print queue $402_n$ to "3". If the driver type identifier $407_p$ in the print queue $402_n$ indicates "XPS" (NO in S1707 and YES in S1709), in S1710, the CPU 302 sets the value of the parameter val3 for the determination-target print queue $402_n$ to "2".

If the driver type identifier $407_p$ in the print queue $402_n$ indicates "FAX" (NO in S1707, NO in S1709, and YES in S1711), in S1712, the CPU 302 sets the value of the parameter val3 for the determination-target print queue $402_n$ to "1". If the driver type identifier $407_p$ in the print queue $402_n$ indicates any other type (NO in S1707, NO in S1709, and NO in S1711), the value of the parameter val3 remains unchanged. After the values of the parameters val1 to val3 are determined, in S1713, the CPU 302 determines the order of priority for recovery of the print queue $402_n$ from the values of the parameters val1 to val3. The determination of the order of priority for recovery based on the values of the parameters val1 to val3 is performed using a recovery priority order table illustrated in FIG. 18A or FIG. 18B.

FIG. 18A and FIG. 18B illustrate examples of the recovery priority order table used in S1713 in FIG. 17. As an example, the application 501 determines the order of priority for recovery of three recovery-target print queues (print queues A to C). The print queue A corresponds to a "default printer", no print job is left in the print queue A, and the print setting thereof remains unchanged from the initial setting. A print job is left in the print queue B, and the print setting thereof has been changed from the initial setting. A print job is left in the print queue C, and the print setting thereof remains unchanged from the initial setting. The printer driver types of the print queues A to C are "XPS", "FAX", and "GDI", respectively.

In FIG. 18A, the print queues A to C are assigned priorities such that a print queue having a higher value of a parameter with a higher degree of contribution to the order of priority for recovery among the values of the parameters val1 to val3 is ranked higher. That is, among the print queues A to C, the print queue A with the highest value of the parameter val1 is the highest ("1") in the order of priority for recovery, and the print queue B with the highest value of the parameter val2 is the second highest ("2") in the order of priority for recovery. The print queue C has the highest value of the parameter val3 in the print queues A to C, but has lower values of the parameters val1 and val2 than the other two print queues. Thus, the print queue C is the third ("3") in the order of priority for recovery.

The order of priority may be set using a method different from that illustrated in FIG. 18A. For example, in FIG. 18B, the print queues A to C are assigned priorities such that a print queue having a higher total value val, which is obtained by multiplying the values of the parameters val1 to val3 by respective coefficients, is ranked higher. As an example, the coefficients by which the parameters val1 to val3 are multiplied are "3", "1.5", and "1", respectively. The coefficients by which the respective parameters are multiplied are not limited to those in this example. A coefficient for a parameter that reduces the priority for recovery may be a negative value. The values val of the print queues A to C are "5", "4", and "4.5", respectively, and the print queues A to C are ranked first ("1"), third ("3"), and second ("2"), respectively, in the order of priority for recovery.

The methods for setting the order of priority illustrated in FIG. 18A and FIG. 18B are examples. Alternatively, whether a print job is left or whether print setting has been changed may be a parameter that is the most important in determining the order of priority, or only the printer driver type may be used to determine the order of priority.

FIG. 12 is a flowchart illustrating the details of the processing of S613 in FIG. 6. First, in S1201, the CPU 302 generates anew port $408_{M+1}$ capable of communicating with the printing apparatus 101. The processing of S1201 will be described in detail with reference to a flowchart illustrated in FIG. 19. After the port $408_{M+1}$ is generated, then, in S1202, the CPU 302 sets the port $408_{M+1}$ as an object to be referred to by the port reference information $404_1$ in the recovery-target print queue $402_1$. Accordingly, the CPU 302 can communicate with the printing apparatus 101 using the print queue $402_1$ and transmit print data to the printing apparatus 101 using the print queue $402_1$. In S1201, as described below with reference to FIG. 19, the WSD port and the host name port are preferentially generated, regardless of the type of the port $408_1$ associated with the port reference information $404_1$ in the print queue $402_1$. Accordingly, even if the IP address of the printing apparatus 101 is changed after recovery is complete, a state in which the printing apparatus 101 can perform printing using the print queue $402_1$ can be maintained as much as possible.

FIG. 19 is a flowchart illustrating the details of the processing of S1201 in FIG. 12. First, in S1900, the CPU 302 determines whether a print queue selected as a recovery target is present. If it is determined in S1900 that a print queue selected as a recovery target is not present, in S1914, the CPU 302 enables a recovery failure flag. Then, the process illustrated in FIG. 19 ends.

On the other hand, if it is determined in S1900 that a print queue selected as a recovery target is present, in S1901, the CPU 302 determines whether the WSD function of the printing apparatus 101 acquired in S603 is valid. If the WSD function of the printing apparatus 101 is valid (YES in S1901), in S1902, the CPU 302 generates the WSD port $408_{M+1}$. Specifically, the CPU 302 searches for the printing apparatus 101 using the WSD protocol to generate a print queue for the printing apparatus 101 and the WSD port $408_{M+1}$. Then, the CPU 302 executes the processing of S1904 and the subsequent processing using the generated WSD port $408_{M+1}$.

After the generation of the WSD port $408_{M+1}$ is complete, then, in S1903, the CPU 302 determines whether communication with the printing apparatus 101 using the WSD port $408_{M+1}$ is enabled. The details of the processing of S1903 has been described above with reference to the flowchart illustrated in FIG. 15 and will not be described in detail.

If it is determined that communication with the printing apparatus 101 using the WSD port $408_{M+1}$ is enabled (YES in S1904), the process ends.

On the other hand, if communication with the printing apparatus 101 using the WSD port $408_{M+1}$ is disabled (NO in S1904) or if the WSD function of the printing apparatus 101 is invalid (NO in S1901), the process illustrated in FIG. 19 proceeds to S1905. The CPU 302 determines whether the LLMNR function of the printing apparatus 101 acquired in S603 is valid (S1905). If the LLMNR function of the printing apparatus 101 is valid (YES in S1905), in S1906, the CPU 302 generates a host name port $408_{M+1}$ using the LLMNR name of the printing apparatus 101. Specifically, the CPU 302 writes TCP/IP as the port type identifier, RAW as the protocol, and port number 9100. Then, the CPU 302 writes the host name acquired from the printing apparatus 101 as the network identifier. Through the process described above, a host name port $408_{M+1}$ using the LLMNR name is generated.

After the generation of the host name port $408_{M+1}$ is complete, then, in S1907, the CPU 302 determines whether communication with the printing apparatus 101 using the host name port $408_{M+1}$ is enabled. The details of the processing of S1907 has been described above with reference to FIG. 16 and will not be described in detail. If it is determined that communication with the printing apparatus 101 using the host name port $408_{M+1}$ is enabled (YES in S1908), the process ends.

On the other hand, if communication with the printing apparatus 101 using the host name port $408_{M+1}$ is disabled (NO in S1908) or if the LLMNR function of the printing apparatus 101 is invalid (NO in S1905), the process illustrated in FIG. 19 proceeds to S1909. The CPU 302 determines whether the DNS function of the printing apparatus 101 acquired in S603 is valid (S1909). If the DNS function of the printing apparatus 101 is valid (YES in S1909), in S1910, the CPU 302 generates a host name port $408_{M+1}$ using the DNS name of the printing apparatus 101. Specifically, the CPU 302 writes TCP/IP as the port type identifier, RAW as the protocol, and port number 9100. Further, the CPU 302 writes a DNS host name and a DNS domain name acquired from the printing apparatus 101 as the network identifier. Through the process described above, a host name port $408_{M+1}$ using the DNS name is generated.

After the generation of the host name port $408_{M+1}$ is complete, then, in S1911, the CPU 302 determines whether communication with the printing apparatus 101 using the host name port $408_{M+1}$ is enabled. The details of the processing of S1911 has been described above with reference to the flowchart illustrated in FIG. 16 and will not be described in detail. If it is determined that communication with the printing apparatus 101 using the host name port $408_{M+1}$ is enabled (YES in S1912), the process ends.

On the other hand, if communication with the printing apparatus 101 using the host name port $408_{M+1}$ is disabled (NO in S1912) or if the DNS function of the printing apparatus 101 is invalid (NO in S1909), the process illustrated in FIG. 19 proceeds to S1913. The CPU 302 generates a fixed IP address port $408_{M+1}$ using the IP address of the printing apparatus 101 (S1913). Specifically, the CPU 302 writes TCP/IP as the port type identifier, RAW as the protocol, and port number 9100. Further, the CPU 302 writes an IP address acquired from the printing apparatus 101 as the network identifier. Through the process described above, a fixed IP address port $408_{M+1}$ is generated. That is, the information processing apparatus 104 determines whether it is possible to generate an automatic tracking port that, in response to the IP address of the printing apparatus 101 being changed after generation of a port, enables communication with a printing apparatus by automatically using the changed IP address. If it is determined that it is not possible to generate the automatic tracking port, the information processing apparatus 104 generates, as a port for a recovery-target print queue, a fixed port that fixedly uses the IP address acquired from the printing apparatus 101.

Not all of the steps in the process illustrated in FIG. 19 need to be executed. For example, the processing of S1901 to S1904 may be omitted.

In this embodiment, WSD is used as a protocol for detecting an apparatus connected to a network, by way of example but not limitation. A different protocol having a function similar to that of WSD may be used. In this embodiment, furthermore, LLMNR and DNS are used as protocols having the name resolution function, by way of example but not limitation. A different protocol having the name resolution function may be used. In this embodiment, moreover, the types of ports to be generated are assigned priorities such that a WSD port and a host name port are ranked in this order. However, any other order may be used. Further, the type of ports to be generated may be either a WSD port or a host name port. In this case, a port may be generated in accordance with the port type of the port $408_1$ set in the print queue $402_1$, as an example.

According to this embodiment, port setting information is set by preferentially using a protocol capable of name resolution. That is, automatic tracking ports, such as a WSD port, an LLMNR port, and a DNS port, are preferentially set. As a result, for example, even if the IP address of a printing apparatus is changed after the process illustrated in FIG. 6 is complete, the information processing apparatus 104 can communicate with the printing apparatus by automatically using the changed IP address.

Through the process described above, the state of the information processing apparatus 104 can be easily changed to a state in which communication with a printing apparatus selected by the user in the process illustrated in FIG. 7 is enabled. The user's convenience can thereby be improved.

Second Embodiment

In the first embodiment, in S613 in FIG. 6, the CPU 302 generates a new port $408_{M+1}$ as a port to beset in the recovery-target print queue $402_1$. In a second embodiment, if the information processing apparatus 104 has a port capable of communicating with the printing apparatus 101, this port is set in the print queue $402_1$ to improve the user's convenience.

The flow of the process of the application 501 according to the second embodiment will be described with reference to a flowchart illustrated in FIG. 20. A process similar to that in the first embodiment will not be described in detail.

FIG. 20 is a flowchart illustrating the details of the processing of S613 in FIG. 6. First, in S2001, the CPU 302 determines whether all the ports 408 in the information processing apparatus 104 include a port capable of communicating with the printing apparatus 101. The processing of S2001 will be described in detail with reference to a flowchart illustrated in FIG. 21.

If it is determined that a port capable of communicating with the printing apparatus 101 is present (YES in S2002), the CPU 302 repeatedly performs the processing of S2004 on all ports in the information processing apparatus 104 that are capable of communicating with the printing apparatus 101 (S2003). First, in S2004, the CPU 302 determines whether the port $408_m$ capable of communicating with the printing apparatus 101 is a fixed IP address port. If the port $408_m$ is not a fixed IP address port, that is, if the port $408_m$ is a WSD port or a host name port (NO in S2004), in S2005, the CPU 302 sets the setting information of the port $408_m$ in the port reference information $404_1$ in the recovery-target print queue $402_1$. At this time, the port type of the port $408_m$ may be restricted such that a port having the same type as that of the port $408_1$, which has been set in the print queue $402_1$ before the recovery operation is performed, can be set. On the other hand, if the port $408_m$ is a fixed IP address port (YES in S2004), the CPU 302 changes the target port to the next port $408_{m+1}$ and executes the processing of S2004. A case where it is determined that all the ports in the information processing apparatus 104 that are capable of communicating with the printing apparatus 101 are fixed IP address ports will be described. In S2006, for example, the CPU 302 sets the setting information of the port that has been first subjected to the determination process of S2004 in the recovery-target print queue $402_1$. At this time, any of the ports capable of communicating with the printing apparatus 101 may be set in the print queue $402_1$.

If it is determined in S2001 that there is no port capable of communicating with the printing apparatus 101 (NO in S2002), in S2007, the CPU 302 generates a new port $408_{M+1}$ capable of communicating with the printing apparatus 101. The details of the processing of S2007 has been described above with reference to FIG. 19 and will not be described in detail. After the port $408_{M+1}$ is generated, then, in S2008, the CPU 302 sets the setting information of the port $408_{M+1}$ in the port reference information $404_1$ in the recovery-target print queue $402_1$. As described above, the information processing apparatus 104 determines whether communication with the printing apparatus 101 using any other existing port different from the port in the recovery-target print queue for the printing apparatus 101 is enabled (S2002). If it is determined that communication with the printing apparatus 101 using any other existing port is enabled, the information processing apparatus 104 changes the port in the recovery-target print queue to the existing port (S2005). The existing port is sometimes referred to as existing port setting information. If the information processing apparatus 104 has existing ports capable of communicating with the printing apparatus 101, the setting information of one of the existing ports capable of communication is set in the recovery-target print queue $402_1$ to change to a state in which communication with the printing apparatus 101 using the print queue $402_1$ is enabled. As a result, the CPU 302 can transmit print data to the printing apparatus 101 using the print queue $402_1$. Accordingly, even if the number of ports in the information processing apparatus 104 has reached the maximum number of ports that can be held, the print queue $402_1$ can be recovered. If all the ports capable of communication are fixed IP address ports as a result of repetition of the processing in S2003, the setting of the port reference information $404_1$ in S2006 may not be performed, but the processing of S2007 and S2008 may be performed. That is, the setting information of a newly generated port may be set in the port reference information $404_1$. This allows a WSD port or a host name port to be preferentially set as a port set in the print queue $402_1$. Thus, even if the IP address of the printing apparatus 101 is changed after recovery is complete, the information processing apparatus 104 can maintain as much as possible the state in which the printing apparatus 101 can perform printing using the print queue $402_1$.

FIG. 21 is a flowchart illustrating the details of the processing of S2001 in FIG. 20. First, the CPU 302 repeatedly performs the processing of S2102 on all the ports 408 in the information processing apparatus 104 (S2101). The details of the processing of S2102 has been described above with reference to the flowchart illustrated in FIG. 14 and will not be described in detail. A case where there is any port capable of communicating with the printing apparatus 101 after the processing of S2102 is performed on all the ports 408 in the information processing apparatus 104 (YES in S2103) will be described. In S2104, the CPU 302 determines that the information processing apparatus 104 has a port capable of communicating with the printing apparatus 101. On the other hand, if there is no port capable of communicating with the printing apparatus 101 (NO in S2103), in S2105, the CPU 302 determines that the information processing apparatus 104 has no port capable of communicating with the printing apparatus 101.

With the process described above, in this embodiment, the generation of a new port $408_{M+1}$ as a port to be set in the recovery-target print queue $402_1$ can be reduced as much as possible. The user's convenience can thus be improved.

Third Embodiment

In the first and second embodiments, the recovery target in S612 and S613 in FIG. 6 is a single print queue. However, in a use environment where a plurality of print queues are separately used depending on the purpose, the user may wish to recover a plurality of print queues. In a third embodiment, accordingly, the recovery target is a plurality of print queues.

An example UI screen according to the third embodiment will be described hereinafter with reference to FIG. 22A and FIG. 22B. A process similar to that in the first or second embodiment will not be described in detail.

Figure 22A:
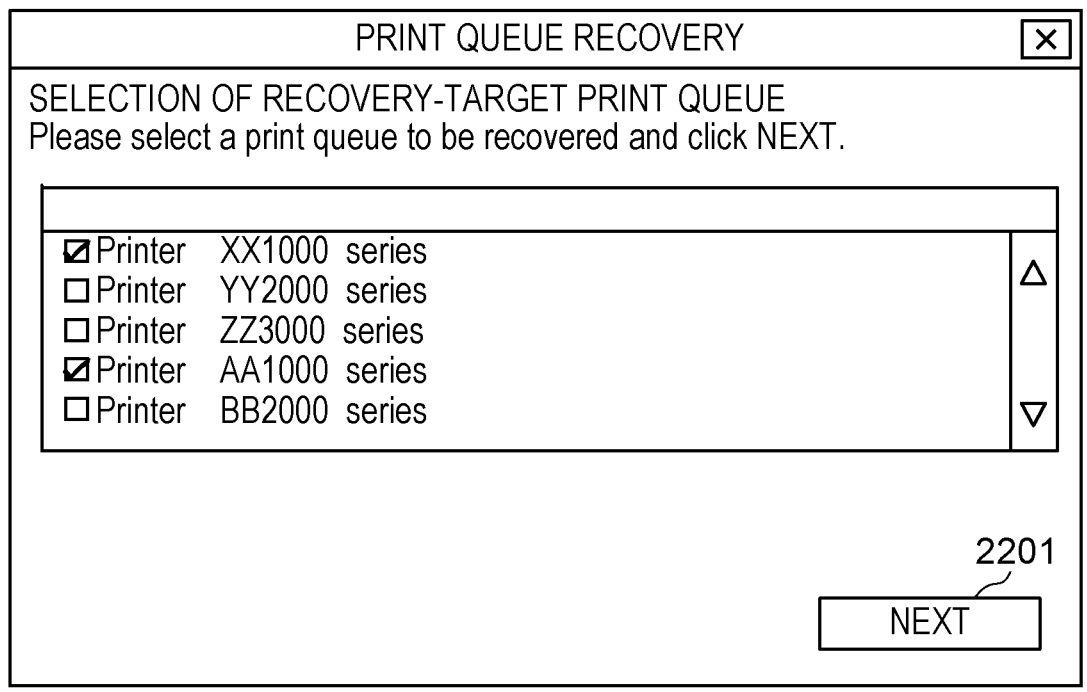
FIG. 22A and FIG. 22B illustrate example UI screens of the application according to one embodiment.
Figure 22B:
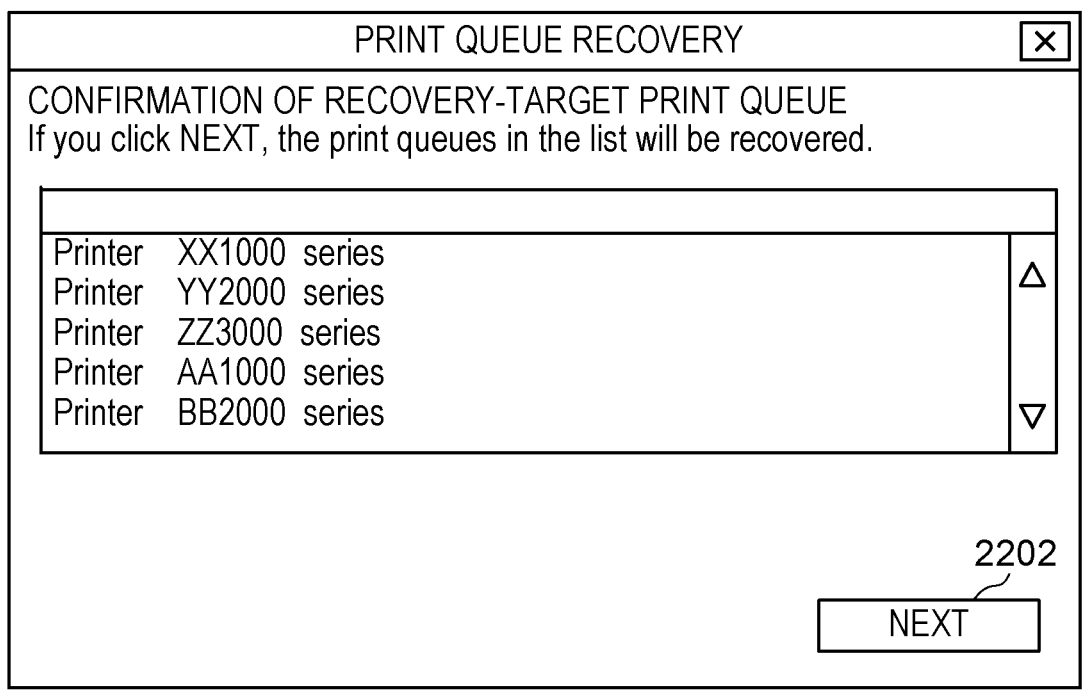

In this embodiment, an example UI screen displayed by the CPU 302 in S612 in FIG. 6 is illustrated in FIG. 22A. In FIG. 22A, the CPU 302 displays a list of recovery-target print queues detected in S608 on the display unit 312 in a selectable format. The user clicks on the checkbox at the left end of a row corresponding to a print queue to be recovered, and then clicks a "next" button 2201. At this time, the user may select a plurality of print queues. Upon detection of pressing of the "next" button 2201, the CPU 302 identifies the plurality of recovery-target print queues.

All the recovery-target print queues detected in S608 may be recovered. An example UI screen displayed in this case is illustrated in FIG. 22B. As illustrated in FIG. 22B, the CPU 302 displays a list of recovery-target print queues detected in S608 on the display unit 312 in a format other than a selectable format. Upon detection of pressing of a "next" button 2202, the CPU 302 identifies all the print queues displayed in the screen illustrated in FIG. 22B as recovery-target print queues.

Upon selection of a plurality of recovery-target print queues, then, in S613, the CPU 302 executes a recovery process on all the identified recovery-target print queues. The recovery process has been described with reference to the first or second embodiment and will not be described in detail in connection with this description of the third embodiment.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments of the present disclosure have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-138245, filed Jul. 26, 2019, which is hereby incorporated by reference herein in its entirety.

What is claimed is:

1. An information processing apparatus for communicating with a printing apparatus, the information processing apparatus comprising:
   a generation unit configured to generate, when communication with the printing apparatus using first port setting information in a print queue for the printing apparatus is disabled, second port setting information that is different from the first port setting information and that enables communication with the printing apparatus, the generation of the second port setting information being based on information acquired from the printing apparatus;
   a change unit configured to change port setting information in the print queue from the first port setting information to the second port setting information,
   wherein, in response to an Internet Protocol (IP) address of the printing apparatus being changed after generation of the second port setting information, the information processing apparatus is able to use the second port setting information to communicate with the printing apparatus by automatically using the changed IP address; and
   a determination unit configured to determine whether it is possible to generate an automatic tracking port, the automatic tracking port being a port that, in response to the IP address of the printing apparatus being changed after generation of the second port setting information, enables communication with the printing apparatus by automatically using the changed IP address,
   wherein when the determination unit determines that it is not possible to generate the automatic tracking port, the generation unit generates, as the second port setting information, a fixed port that fixedly uses an IP address acquired from the printing apparatus, and
   wherein the generation unit and the change unit are implemented by at least one processor of the information processing apparatus.

2. The information processing apparatus according to claim 1, further comprising:
- a determination unit configured to determine, when communication with the printing apparatus using the first port setting information in the print queue for the printing apparatus is disabled, whether communication with the printing apparatus using another existing port setting information different from the first port setting information is enabled,
- wherein when the determination unit determines that communication with the printing apparatus using the another existing port setting information is enabled, the change unit changes the port setting information in the print queue from the first port setting information to the another existing port setting information without generation of the second port setting information.

3. The information processing apparatus according to claim 2, further comprising:
- an identification unit configured to identify a media access control (MAC) address from a universally unique identifier (UUID) set in the another existing port setting information; and
- a search unit configured to search for the printing apparatus using the UUID when a match is found between a MAC address acquired from the printing apparatus and the identified MAC address,
- wherein when the printing apparatus is found using the UUID, the determination unit determines that communication with the printing apparatus using the another existing port setting information is enabled.

4. The information processing apparatus according to claim 2, further comprising
- an acquisition unit configured to acquire the IP address of the printing apparatus using a host name set in the another existing port setting information when a match is found between a host name acquired from the printing apparatus and the host name set in the another existing port setting information,
- wherein when a match is found between the IP address acquired by the acquisition unit and an IP address acquired from the printing apparatus, the determination unit determines that communication with the printing apparatus using the another existing port setting information is enabled.

5. The information processing apparatus according to claim 1, wherein the second port setting information comprises a Web Services on Devices (WSD) port.

6. The information processing apparatus according to claim 1, wherein the second port setting information comprises a Link-Local Multicast Name Resolution (LLMNR) port or a Domain Name System (DNS) port.

7. The information processing apparatus according to claim 1, further comprising
- a transmission unit configured to transmit, in response to an instruction being input from a user to perform printing, print data to the printing apparatus using the print queue in which the port setting information has been changed to the second port setting information.

8. A control method comprising:
- generating, when communication with a printing apparatus using first port setting information in a print queue for the printing apparatus is disabled, second port setting information that is different from the first port setting information and that enables communication with the printing apparatus, the generation of the second port setting information being based on information acquired from the printing apparatus;
- changing port setting information in the print queue from the first port setting information to the second port setting information; and
- determining whether it is possible to generate an automatic tracking port, the automatic tracking port being a port that, in response to the IP address of the printing apparatus being changed after generation of the second port setting information, enables communication with the printing apparatus by automatically using the changed IP address,
- wherein when it is determined that it is not possible to generate the automatic tracking port, a fixed port that fixedly uses an IP address acquired from the printing apparatus is generated as the second port setting information, and
- wherein, in response to an Internet Protocol (IP) address of the printing apparatus being changed after generation of the second port setting information, the information processing apparatus is able to use the second port setting information to communicate with the printing apparatus by automatically using the changed IP address.

9. The control method according to claim 8, further comprising
- determining, when communication with the printing apparatus using the first port setting information in the print queue for the printing apparatus is disabled, whether communication with the printing apparatus using another existing port setting information different from the first port setting information is enabled,
- wherein when it is determined that communication with the printing apparatus using the another existing port setting information is enabled, the port setting information in the print queue is changed from the first port setting information to the another existing port setting information without generation of the second port setting information.

10. The control method according to claim 9, further comprising:
- identifying a media access control (MAC) address from a universally unique identifier (UUID) set in the another existing port setting information; and
- searching for the printing apparatus using the UUID when a match is found between a MAC address acquired from the printing apparatus and the identified MAC address,
- wherein when the printing apparatus is found using the UUID, it is determined that communication with the printing apparatus using the another existing port setting information is enabled.

11. The control method according to claim 9, further comprising
- acquiring the IP address of the printing apparatus using a host name set in the another existing port setting information when a match is found between a host name acquired from the printing apparatus and the host name set in the another existing port setting information,
- wherein when a match is found between the acquired IP address and an IP address acquired from the printing apparatus, it is determined that communication with the printing apparatus using the another existing port setting information is enabled.

12. The control method according to claim 8, wherein the second port setting information comprises a Web Services on Devices (WSD) port.

13. The control method according to claim 8, wherein the second port setting information comprises a Link-Local Multicast Name Resolution (LLMNR) port or a Domain Name System (DNS) port.

14. The control method according to claim 8, further comprising
transmitting, in response to an instruction being input from a user to perform printing, print data to the printing apparatus using the print queue in which the port setting information has been changed to the second port setting information.

15. A non-transitory computer-readable storage medium storing a program for causing a computer to perform a function comprising:
generating, when communication with a printing apparatus using first port setting information in a print queue for the printing apparatus is disabled, second port setting information that is different from the first port setting information and that enables communication with the printing apparatus, the generation of the second port setting information being based on information acquired from the printing apparatus;
changing port setting information in the print queue from the first port setting information to the second port setting information; and
determining whether it is possible to generate an automatic tracking port, the automatic tracking port being a port that, in response to the IP address of the printing apparatus being changed after generation of the second port setting information, enables communication with the printing apparatus by automatically using the changed IP address,
wherein when it is determined that it is not possible to generate the automatic tracking port, a fixed port that fixedly uses an IP address acquired from the printing apparatus is generated as the second port setting information, and
wherein, in response to an Internet Protocol (IP) address of the printing apparatus being changed after generation of the second port setting information, the information processing apparatus is able to use the second port setting information to communicate with the printing apparatus by automatically using the changed IP address.

16. The non-transitory computer-readable storage medium according to claim 15,
wherein the function further comprises
determining, when communication with the printing apparatus using the first port setting information in the print queue for the printing apparatus is disabled, whether communication with the printing apparatus using another existing port setting information different from the first port setting information is enabled, and
wherein when it is determined that communication with the printing apparatus using the another existing port setting information is enabled, the changing changes the port setting information in the print queue from the first port setting information to the another existing port setting information without generation of the second port setting information.

17. The non-transitory computer-readable storage medium according to claim 16,
wherein the function further comprises:
identifying a media access control (MAC) address from a universally unique identifier (UUID) set in the another existing port setting information; and
searching for the printing apparatus using the UUID when a match is found between a MAC address acquired from the printing apparatus and the identified MAC address, and
wherein when the printing apparatus is found using the UUID, the determining determines that communication with the printing apparatus using the another existing port setting information is enabled.

18. The non-transitory computer-readable storage medium according to claim 16,
wherein the function further comprises
acquiring the IP address of the printing apparatus using a host name set in the another existing port setting information when a match is found between a host name acquired from the printing apparatus and the host name set in the another existing port setting information, and
wherein when a match is found between the acquired IP address and an IP address acquired from the printing apparatus, the determining determines that communication with the printing apparatus using the another existing port setting information is enabled.

* * * * *